(12) United States Patent
Lee

(10) Patent No.: US 10,198,422 B2
(45) Date of Patent: Feb. 5, 2019

(54) INFORMATION-PROCESSING EQUIPMENT BASED ON A SPREADSHEET

(71) Applicant: Mitsubishi Electric Corporation, Tokyo (JP)

(72) Inventor: Weihau Lee, Vernon Hills, IL (US)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 60 days.

(21) Appl. No.: 14/934,948

(22) Filed: Nov. 6, 2015

(65) Prior Publication Data

US 2017/0132194 A1  May 11, 2017

(51) Int. Cl.
G06F 17/00 (2006.01)
G06F 17/24 (2006.01)
H04L 29/08 (2006.01)

(52) U.S. Cl.
CPC .......... *G06F 17/246* (2013.01); *H04L 67/104* (2013.01)

(58) Field of Classification Search
CPC ............................ G06F 17/246; H04L 67/104
See application file for complete search history.

(56) References Cited

U.S. PATENT DOCUMENTS

| | | | |
|---|---|---|---|
| 5,038,318 A | 8/1991 | Roseman | |
| 7,117,043 B1 | 10/2006 | Frederick et al. | |
| 2009/0125129 A1 | 5/2009 | Eldridge et al. | |
| 2009/0303239 A1 | 12/2009 | Ang et al. | |
| 2011/0040390 A1 | 2/2011 | Blevins et al. | |
| 2012/0303645 A1 | 11/2012 | Kulkarni-Puranik | |
| 2014/0149836 A1 | 5/2014 | Bedard et al. | |

FOREIGN PATENT DOCUMENTS

| | | |
|---|---|---|
| JP | H09-201746 A | 8/1997 |
| JP | 2002-370142 A | 12/2002 |
| JP | 2011-40059 A | 2/2011 |
| WO | 00/70417 A1 | 11/2000 |

OTHER PUBLICATIONS

International Search Report dated Dec. 27, 2016, issued by the International Searching Authority in application No. PCT/JP2016/081335.
Communication dated Jan. 16, 2018, from Japanese Patent Office in counterpart application No. 2017-548709.
Communication dated Nov. 22, 2017, from the Intellectual Property Office of Taiwan in counterpart application No. 105135691.
Notification of Reason for Refusal, dispatched Aug. 21, 2018, in corresponding Korean Application No. 10-2018-7011834, 18 pages in English and Korean.
Communication dated Jun. 14, 2018, from the Taiwanese Intellectual Property Office in counterpart application No. 105135691.

*Primary Examiner* — Stephen S Hong
*Assistant Examiner* — Marshon L Robinson
(74) *Attorney, Agent, or Firm* — Sughrue Mion, PLLC; Richard C. Turner

(57) ABSTRACT

An engineering tool includes a spreadsheet editor configured to display a definition in cells of a spreadsheet, and to edit the definition by setting allocation data of a device to a cell among the cells of the spreadsheet or by setting a calculation defined in some cells among the cells of the spreadsheet in reference to other cells among the cells of the spreadsheet; and an executable module file generator configured to generate, based on the edited definition, an executable module file configured to be executed in an execution environment of a controller in order for the controller to control the device.

18 Claims, 28 Drawing Sheets

FIG. 19

| Object | Type | SubType | Property |
|---|---|---|---|
| graph_sample | Data | Table | |
| group_table | Data | Table | |
| prdct_rslt | Data | Table | |
| SendSQL | Action | Single Data | |
| MailServer | Object | Mail Server | independent |
| SendMail | Action | - | |
| AzureDB | Object | DB | independent |
| AAA | Data | Table | |
| PRINTER_ALARM | Data | Table | |
| SendSQL | Action | Single Data | |
| LogicalModel | Object | Container | independent |
| Printer | Object | Container | independent |
| InkLevel | Object | Container | independent |
| Cyan | Data | Single Data | Independent:Alias |
| Yellow | Data | Single Data | Independent:Alias |
| Magenta | Data | Single Data | Independent:Alias |
| Black | Data | Single Data | Independent:Alias |
| BatteryStatus | Object | Container | independent |
| MainBattery | Data | Single Data | Independent:Alias |
| SubBattery | Data | Single Data | Independent:Alias |
| CoolingFanHours | Object | Container | independent |
| ControlPanel | Data | Single Data | Independent:Alias |
| MainMotorAmp | Data | Single Data | Independent:Alias |
| AlarmMonitorSheets | Object | Spread She | independent |
| AlarmCheck | Data | Table | |
| SendAlarm | Data | Table | |
| AlarmDetection | Action | - | |
| ActionName2 | Action | - | |
| StatusLoggingSheet | Object | Spread She | independent |
| PrinterData | Data | Table | |
| ExecLogging | Action | - | |
| WebPages | Object | Container | independent |
| AlarmMonitor | Object | Web Page | independent |
| PrintingStatusDB | Object | Web Page | independent |
| AlarmQuery | Object | Web Page | independent |
| PrinterDashboard | Object | Web Page | independent |
| EnergyForcast | Object | Web Page | independent |
| MainPage | Object | Web Page | independent |
| BatchProcesses | Object | Container | independent |
| CorrelationAnalysis | Object | Spread She | independent |
| AnalysisSheet | Data | Table | |
| EMS_CorrelationAnalysis | Action | - | |

| Object | Type | SubType | Property |
|---|---|---|---|
| NGIS DEMO | | | |
| PhysicalDev | Object | Container | independent |
| LCPU | Object | PLC | independent |
| D | Object | PLC Register | |
| Int1 | Data | Array | |
| UInt | Data | Array | |
| M | Object | PLC Register | |
| Bit | Data | Array | |
| X | Object | PLC Register | |
| Bit | Data | Array | |
| Y | Object | PLC Register | |
| Bit | Data | Array | |
| Value | Data with Single Data | | |
| String | Data with Single Data | | |
| CPUErr | Object | PLC label | |
| Batt | Data | Array | |
| Systen | Object | PLC label | |
| 1Sec | Data | Single Data | |
| 2Sec | Data | Single Data | |
| Systen | Object | PLC label | |
| 1Sec | Data | Single Data | |
| Built-in D | Object | DB | independent |
| PRINTI | Data | Table | |
| alarm_ | Data | Table | |
| availat | Data | Table | |
| day_sa | Data | Table | |
| graph_ | Data | Table | |
| group_ | Data | Table | |
| prdct_r | Data | Table | |
| SendS | Action | Single Data | |
| MailServ | Object | Mail Server | independent |
| SendM | Action | - | |
| AzureDB | Object | DB | independent |
| AAA | Data | Table | |
| PRINTI | Data | Table | |
| SendS | Action | Single Data | |
| LogicalMod | Object | Container | independent |
| Printer | Object | Container | independent |
| InkLev | Object | Container | independent |
| Cyan | Data | Single Data | Independent:Alias |
| Yello | Data | Single Data | Independent:Alias |
| Mag | Data | Single Data | Independent:Alias |

INFORMATION-PROCESSING EQUIPMENT BASED ON A SPREADSHEET

BACKGROUND

1. Field

The exemplary embodiments disclosed herein relate to apparatuses, systems and methods for processing data derived from devices such as, for example, factory automation ("FA") devices including industrial robots, machining tools, and embedded devices.

2. Brief Description of Related Art

In the technical field of factory automation ("FA"), people operating factory devices frequently use networked computing systems, such as computing systems connected to the World-Wide Web (a Web-based computing system), to perform various tasks, such as monitoring the factory devices and processing data related to the factory devices. In the related art, a common way to develop a Web-based computing system is to separately create various types of programs, such as a program for communicating with an Information Technology (IT) system, a program for communicating with factory devices, a program for processing data, and a program for displaying and executing processed data on the Web, and then configure these separately created programs to communicate with each other through a communication protocol.

Since Web-based technology has been utilized throughout the world, Web-based technology has started to become utilized to perform visualization and information processing operations for factory devices.

FIG. 16 illustrates a Web-based system for processing data derived from FA devices according to the related art. As shown in FIG. 16, the Web-based system 1600 includes an actual device 1603 and a programming environment 1623 (e.g., a tool used to write code, validate correctness of the code, and compile the code to run on a particular target platform).

The actual device 1603 includes a program executing space 1605, which includes a program for processing data 1607 and a program for communicating with an external device 1609, and a Web server 1615. The program for processing data 1607 performs various types of data processing operations, such as data filtering, aggregation, transforming (scaling, etc.), and judgment (business logic), and communicates with the Web server 1615, which in turn communicates with a Web client 1619. The program for processing data 1607 also communicates with the coding environment 1617. The program for communicating with an external device 1609 is enabled to communicate with various types of systems according to various types of communication protocols. The program for communicating with an external device 1609 communicates with the IT system 1611 using a communication protocol such as HTTP, FTP, or JDBC, and communicates with a factory automation (FA) device 1613 using RS-232C, Ethernet, or a low level I/O. The program for communicating with an external device 1609 further communicates with a coding environment 1617.

The programming environment 1623 includes a coding environment 1617 which is an environment in which computer codes to perform the above-noted processes are generated. The coding environment may require a user to generate at least five different types of computer code, including (1) a code based on C language for communication with factory devices, (2) a code based on Java for communication with the IT system 1611, (3) a code based on HTML, JavaScript, or PHP for a Web application, (4) a code based on SQL, for accessing a database, and (5) a code based on Lua, for describing business logic. In certain situations, more than five types of codes may be necessary. Once a user generates these various computer codes, the coding environment then communicates with the program for processing data 1607, the program for communicating with external devices 1609, and files for the World Wide Web 1621, using these generated codes.

As explained above, according to the related art Web-based system 1600, a person developing and operating the Web-based system 1600 needs to be proficient in numerous different types of computer languages to generate the appropriate types of computer code for processing data of the FA devices, and also needs to be proficient in numerous different types of protocols used to exchange data between the Web-based system 1600, the FA devices, the IT system, and other entities. Moreover, a person operating the Web-based system 1600 needs to have highly specialized knowledge of the FA system itself, as well as other systems interacting with the FA system, including the IT system 1611 and the Web client 1619. Furthermore, a person operating the Web-based system 1600 needs to understand how to seamlessly combine data processing and communication processing operations, which can be a very complicated process.

As a result, there are very few people with the necessary skills to develop and operate Web-based systems for processing data of the FA devices.

U.S. Pat. No. 5,038,318 to Roseman discloses programmable logic controllers that direct the automatic operation of machine tools and process equipment.

U.S. Pat. No. 7,117,043 to Frederick et al. discloses a technique of creating a spreadsheet including information relating to devices and functions of a system to be controlled by a programmable logic controller (PLC), analyzing the spreadsheet, and writing PLC logic to control the system.

U.S. 2014/0149836 to Bedard discloses a method by which a dashboard container file is received that includes a spreadsheet file and a dashboard structure file, each of the spreadsheet file and the dashboard structure file are converted into a text-based, language-independent data interchange format, and data characterizing a dashboard can then be provided using the converted spreadsheet and dashboard files.

However, these related art techniques do not solve the above-noted problem that there are very few people with the necessary skills to develop and operate Web-based systems for processing data of devices, such as FA devices.

The above description of the related art does not constitute an admission of prior art in any way.

SUMMARY

Aspects of the exemplary embodiments may solve these and/or other problems associated with the related art Web-based systems for processing data of the FA devices. It is understood, however, that aspects of the exemplary embodiments are not required to solve the above problems.

According to an aspect of an exemplary embodiment, there is provided an engineering tool, including: a spreadsheet editor configured to display a definition in cells of a spreadsheet, and to edit the definition by setting allocation data of a device to a cell among the cells of the spreadsheet or by setting a calculation defined in some cells among the cells of the spreadsheet in reference to other cells among the cells of the spreadsheet; and an executable module file generator configured to generate, based on the edited definition, an executable module file configured to be executed in an execution environment of a controller in order for the controller to control the device.

The engineering tool may include a spreadsheet data generator configured to generate spreadsheet data in a data description language, and transmit the spreadsheet data to the controller.

The engineering tool may further include a flowchart editor configured to receive input editing a process sequence in a flowchart and edit the definition based on the input.

The engineering tool may further include a Web display file generator configured to generate Web files based on the edited definition.

The engineering tool may be configured to cause a display to display the spreadsheet and a data model including information about the device simultaneously.

The engineering tool may be configured to cause a display to display the spreadsheet and a flowchart related to the spreadsheet simultaneously.

The spreadsheet editor may further be configured to convert cell data included in the cells of the spreadsheet from a first format to a second format, concatenate the converted data, and transmit the concatenated data to an external system.

The spreadsheet editor may further be configured to receive concatenated data from the external system, de-concatenate the data, convert the de-concatenated data from the second format to the first format, and transmit the converted data to a program, or device controlling a data model stored in the system.

The spreadsheet editor may further be configured to parse a response message received from the external system to thereby generate response intermediate data, to parse a template received from the external system to thereby generate template intermediate data and mapping data, extract a difference between the response intermediate data and the template intermediate data and thereby generate difference data, map the difference data to final data based on the mapping data, and transmit the final data to the program or device controlling the data model.

The engineering tool may further include: a third-party application; and an input/output (I/O) configuration interface configured to grant the third-party application access to at least one function of the engineering tool.

The engineering tool may further include a profile executor configured to generate a data model related to the spreadsheet based on a profile definition and link the data model to the spreadsheet.

According to an aspect of another exemplary embodiment, there is provided a system configured to process data, the system including an engineering tool, including: a spreadsheet editor configured to display a spreadsheet comprising data of a device and to execute a spreadsheet program based on the data and thereby generate a spreadsheet configuration as an execution result; a module file generator configured to generate a module file, which may be a script file, based on the spreadsheet configuration; an external device access configuration editor configured to generate a configuration screen based on a data description language; and a data model information manager configured to generate a configuration of an entire data model based on data models of a plurality of external devices, and a controller including: a module file executor configured to execute the module file separately from the spreadsheet editor executing the spreadsheet program; an external device executor configured to obtain device information of the plurality of external devices and generate the data models based on the device information; and a driver solver configured to generate an interface to enable access to device data of the external devices based on the entire data model.

The engineering tool may further include a data model structure editor configured to receive user input and edit a structure of one of the data models based on the user input.

The spreadsheet editor may be further configured to generate the spreadsheet configuration based on the entire data model.

The engineering tool may further include a Web display file generator configured to generate Web files based on the spreadsheet configuration, and the controller may further include a Web server configured to exchange the Web files with a Web client.

According to an aspect of another exemplary embodiment, there is provided an engineering tool for generating a module file which a controller executes to control a device connected to the controller, the engineering tool including: a spreadsheet editor configured to display a spreadsheet comprising data of a device and to execute a spreadsheet program based on the data and thereby generate a spreadsheet configuration as an execution result; and a module file generator configured to generate the module file based on the spreadsheet configuration.

According to an aspect of another exemplary embodiment, there is provided a module to be used in a controller to control a device connected to the controller based on a module file generated by an engineering tool based on a spreadsheet, the module including: a module file executor configured to execute the module file separately from the engineering tool, wherein the controller controls the device according to the execution of the module file executor.

BRIEF DESCRIPTION OF DRAWINGS

These and/or other aspects will become apparent and more readily appreciated from the following description of the exemplary embodiments, taken in conjunction with the accompanying drawings in which:

FIG. 19 is an example of a data model according to an exemplary embodiment;

FIGS. 21-22 are spreadsheets according to an exemplary embodiment;

DETAILED DESCRIPTION OF EXEMPLARY EMBODIMENTS

General Overview of Web-Based System

Figure 1:
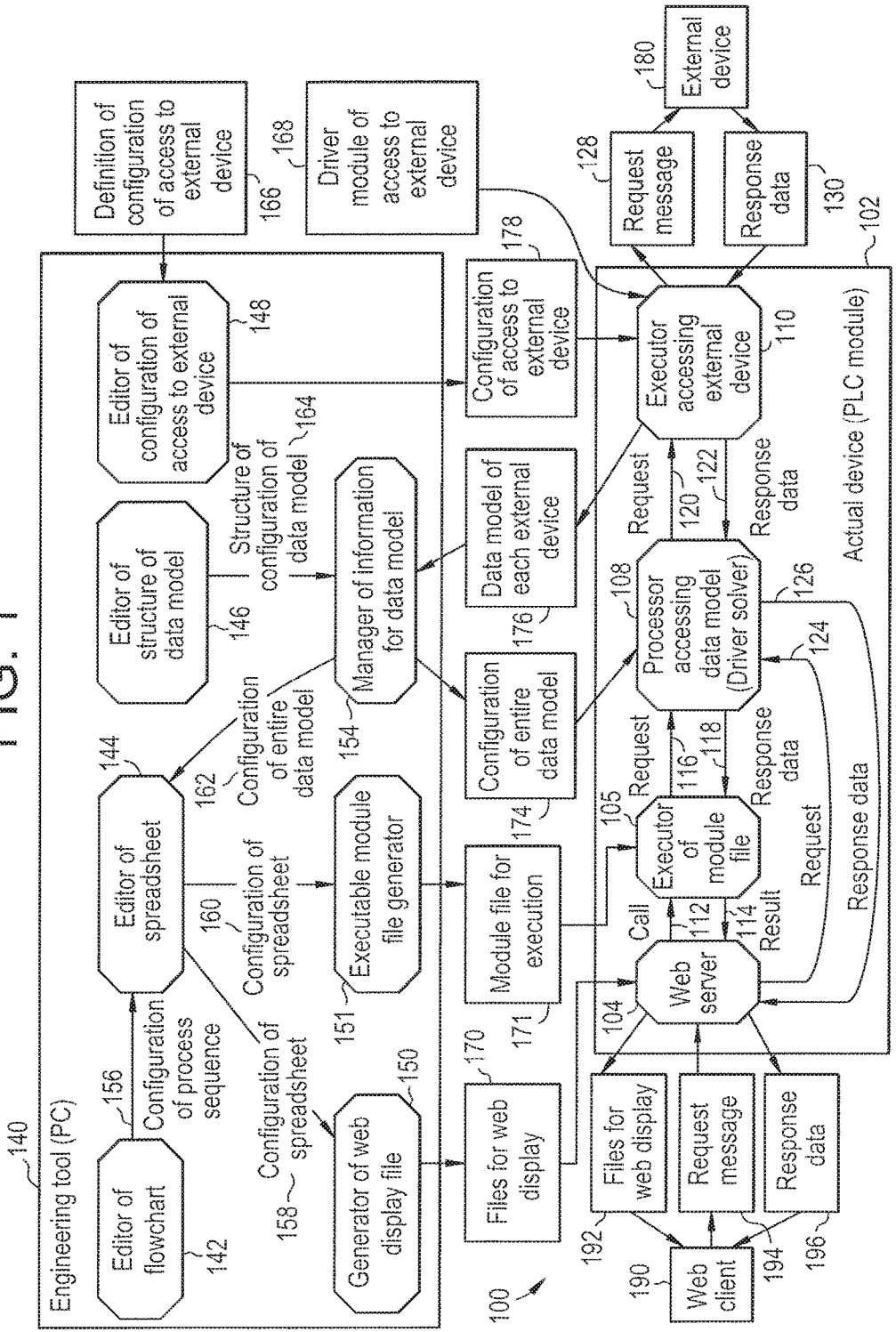
FIG. 1 is an illustration of a Web-based system for processing data according to a first exemplary embodiment.

Aspects of exemplary embodiments provide a Web-based system which improves the ability of people operating factory automation ("FA") devices, such as industrial robots, machining tools, and embedded devices, to control the FA devices and to process data derived from the FA devices. The exemplary embodiments are not, however, limited to FA devices, and may also be applied to numerous other types of devices which are directly or indirectly connected together across various types of networks. For example, the exemplary embodiments may be used to control devices connected via the Internet, the Internet of Things (IoT), local area networks (LANs), wide area networks (WANs), cellular networks, bluetooth networks, near field communication (NFC) networks, and many other types of networks. The devices may include any type of device connectable to a network, such as home automation system devices (e.g., refrigerators, dishwashers, televisions, HVAC, lights, etc.). Aspects of exemplary embodiments may be applied for industrial applications, as well as personal applications (e.g., hobbies), and are not limited to any particular type of application.

Terms such as "information", "data", "definition", and other similar terms, which are used throughout the description of the exemplary embodiments, broadly refer to many different types of information, data, and definitions, and are not limited to any particular context. For example, the terms "information" or "data" may refer to information or data which is related to fixed characteristics of electronic devices (e.g., identifying information), dynamically changing status information (e.g., power levels, performance information, cycles/sec, ink levels, memory storage levels, other settings), connectivity information (e.g., Wi-Fi, cellular, intranet, Internet, etc), location information (e.g., fixed location information, GPS coordinates), financial information, and many other types of information both directly and indirectly related to the electronic devices. Furthermore, the term "definition" may, for example, broadly refer to any sort of information which is described in a cell of spreadsheet. A description may have many different meanings depending on the context in which the description is provided. In a spreadsheet environment, a context of each description varies the kind of meaning which the description has in each cell. The term "definition" may refer to a description of information in a cell of a spreadsheet, regardless of a particular context. In other words, the "definition" may broadly be a context-independent description of information in a spreadsheet cell. As another example, a "definition" may define, for example, a mathematical or business logic definition (e.g., a SUM function or a conditional logic function (IF, ELSE, etc.)), an attribute, an arrangement, a configuration, a rule (e.g., algorithm), or some other characteristic of information of a device or a device itself. Moreover, although exemplary embodiments are described in connection with factory devices, it is understood that the exemplary embodiments are not limited thereto, and may also be implemented in accordance with many other types of devices, including personal electronic devices, home automation and appliances, automotive devices, and many other types of electronic or non-electronic devices.

According to an exemplary embodiment, an engineering tool is used to create a setup screen displayed on the Web-based system. The setup screen may be a spreadsheet application which resembles an Excel document, but is not necessarily an Excel document. The system is created based on a type of spreadsheet, and the spreadsheet is used to perform calculations and achieve visualization using graphs, as well as to create and change the sequence of processes and control or test devices using the sequence of processes.

The Web-based system according to an exemplary embodiment provides an improved technique which easily enables a user of the Web-based system to obtain data for various types of data processing and monitoring operations (e.g., generate a graph of device performance). The Web-based system can be connected to various types of devices, such as a programmable logic controller (PLC), a mail server, and other devices. For example, if a user of the Web-based system desires to connect to a sequencer (e.g., an electromechanical system for controlling a sequence of events automatically, such as the order of operation of factory devices), data stored in the sequencer would be displayed on the screen of the Web-based system. As another example, if a user of the Web-based system desires to connect to a database (DB), data tables of the DB would be displayed.

According to an exemplary embodiment, the Web-based system includes 3 main features.

Figure 17:
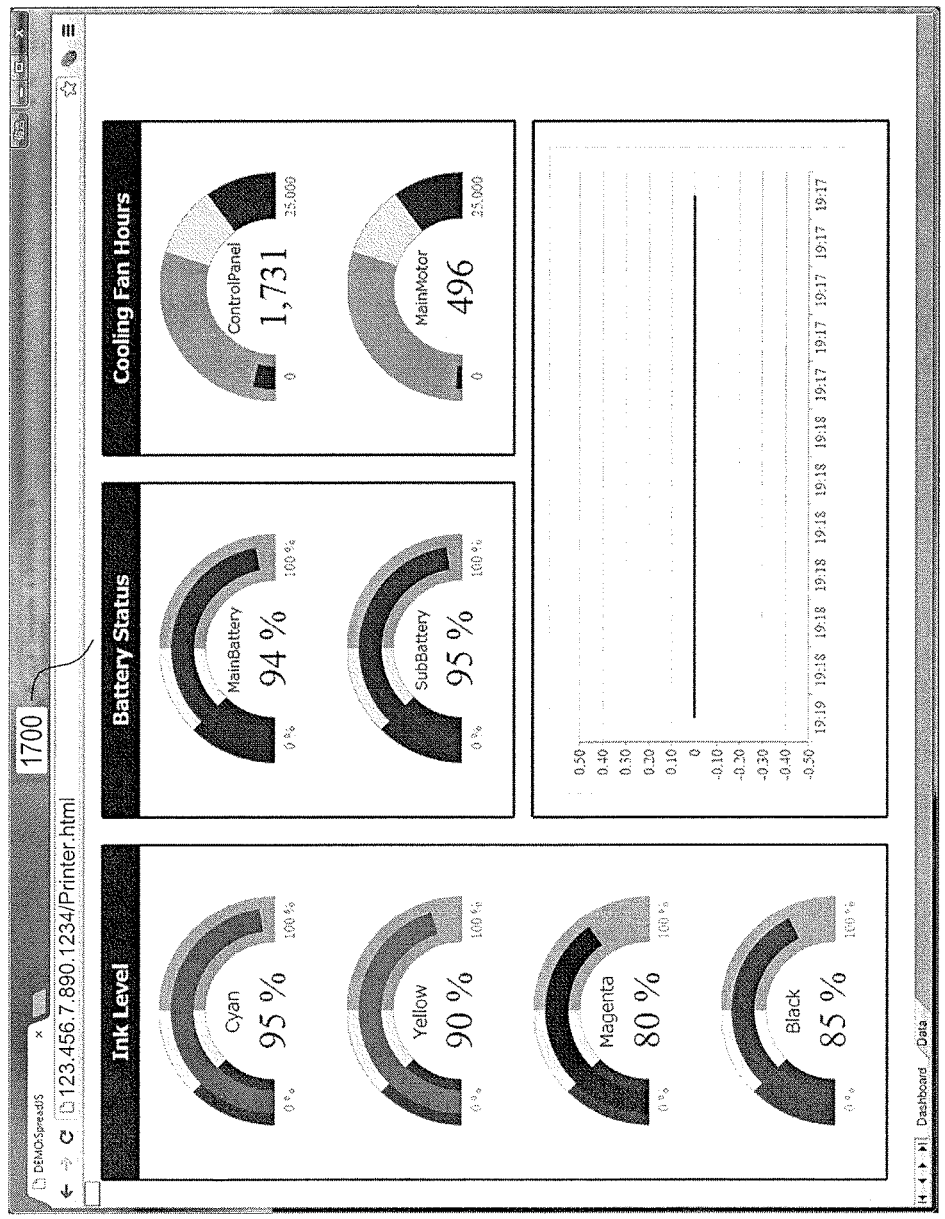
FIGS. 17 and 18 are examples of screen shots indicating a status of factory automation (FA) devices according to an exemplary embodiment.
Figure 18:
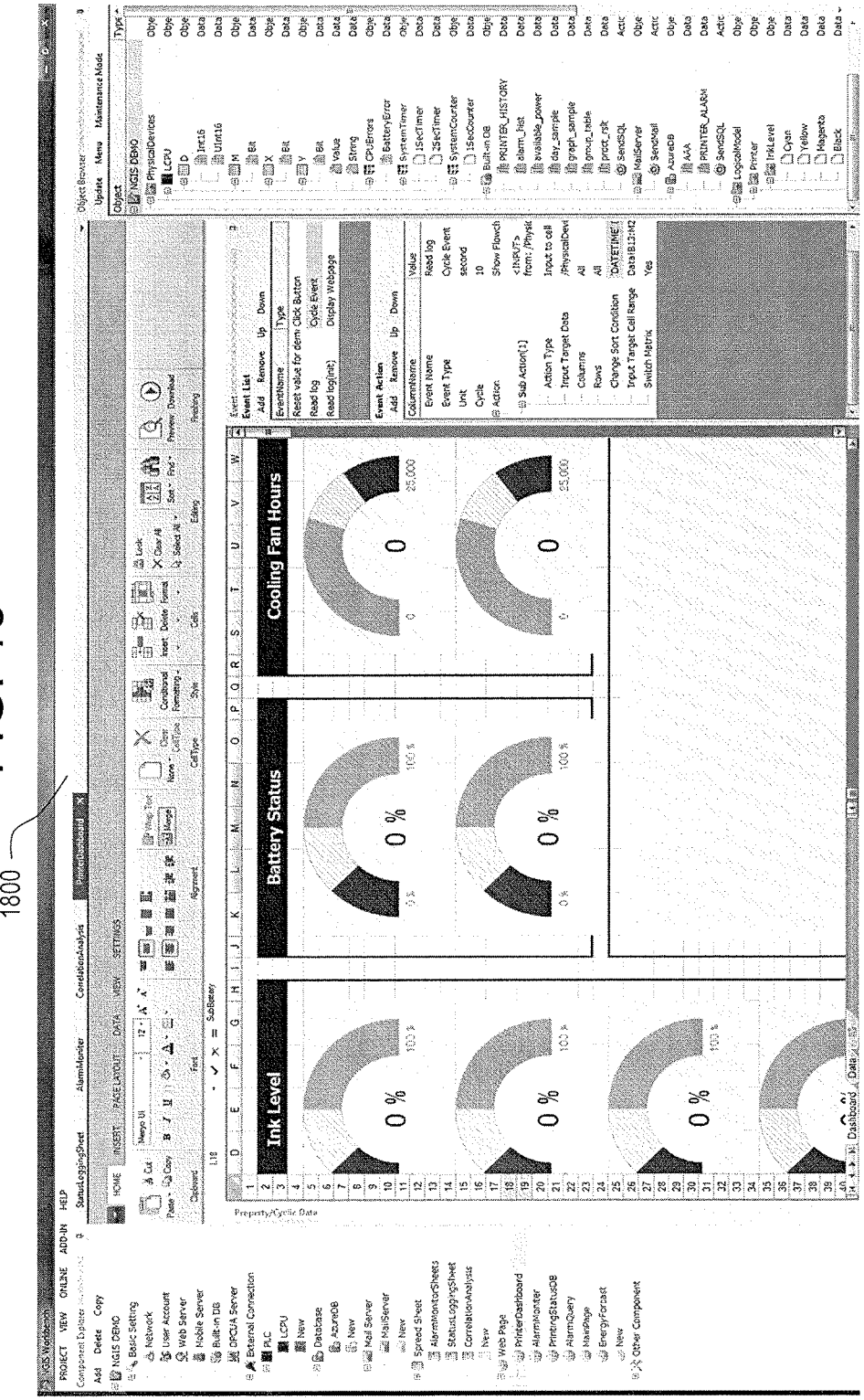
Figure 24:
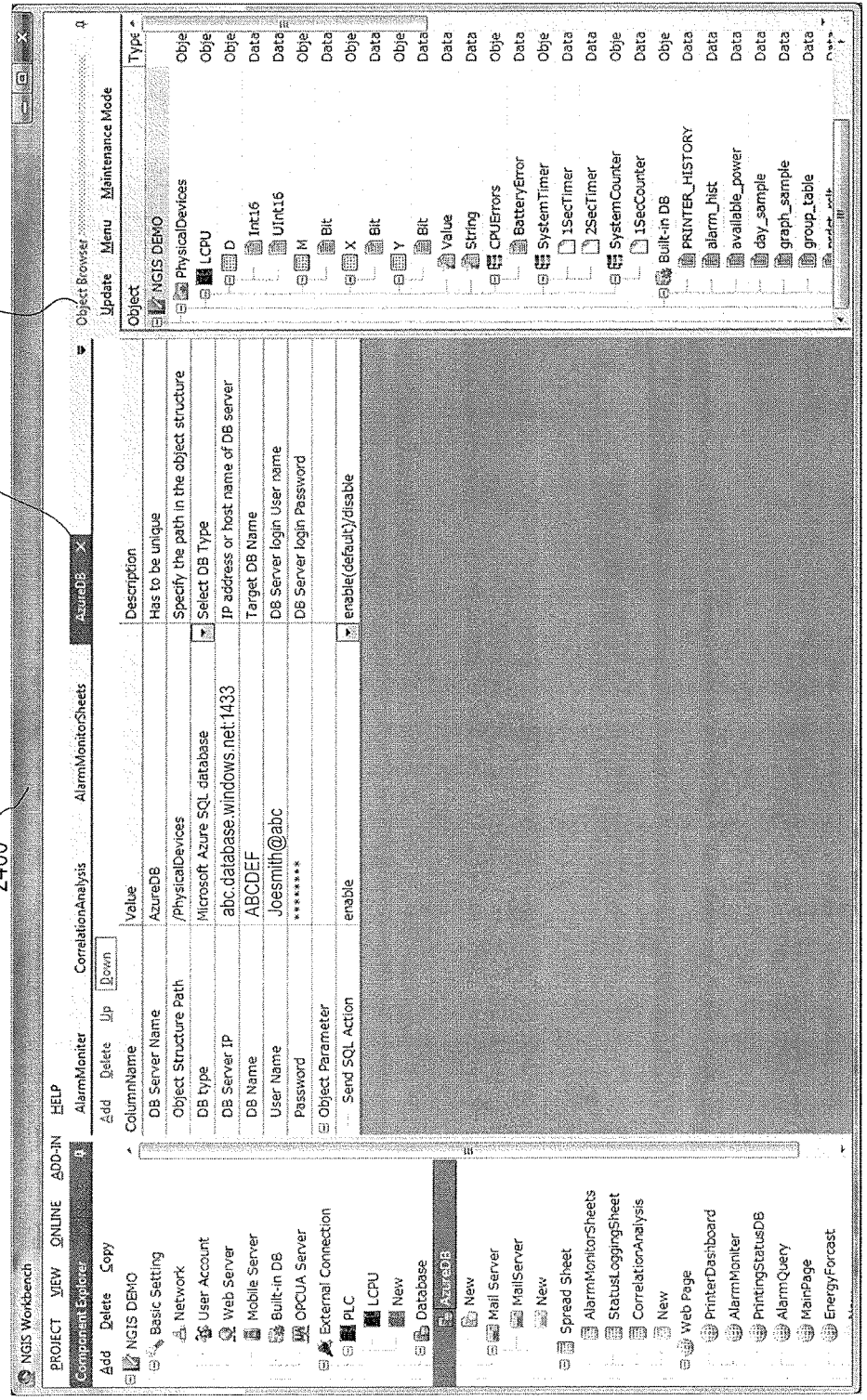
FIGS. 24-25 are examples of screens including data models according to an exemplary embodiment.
Figure 25:
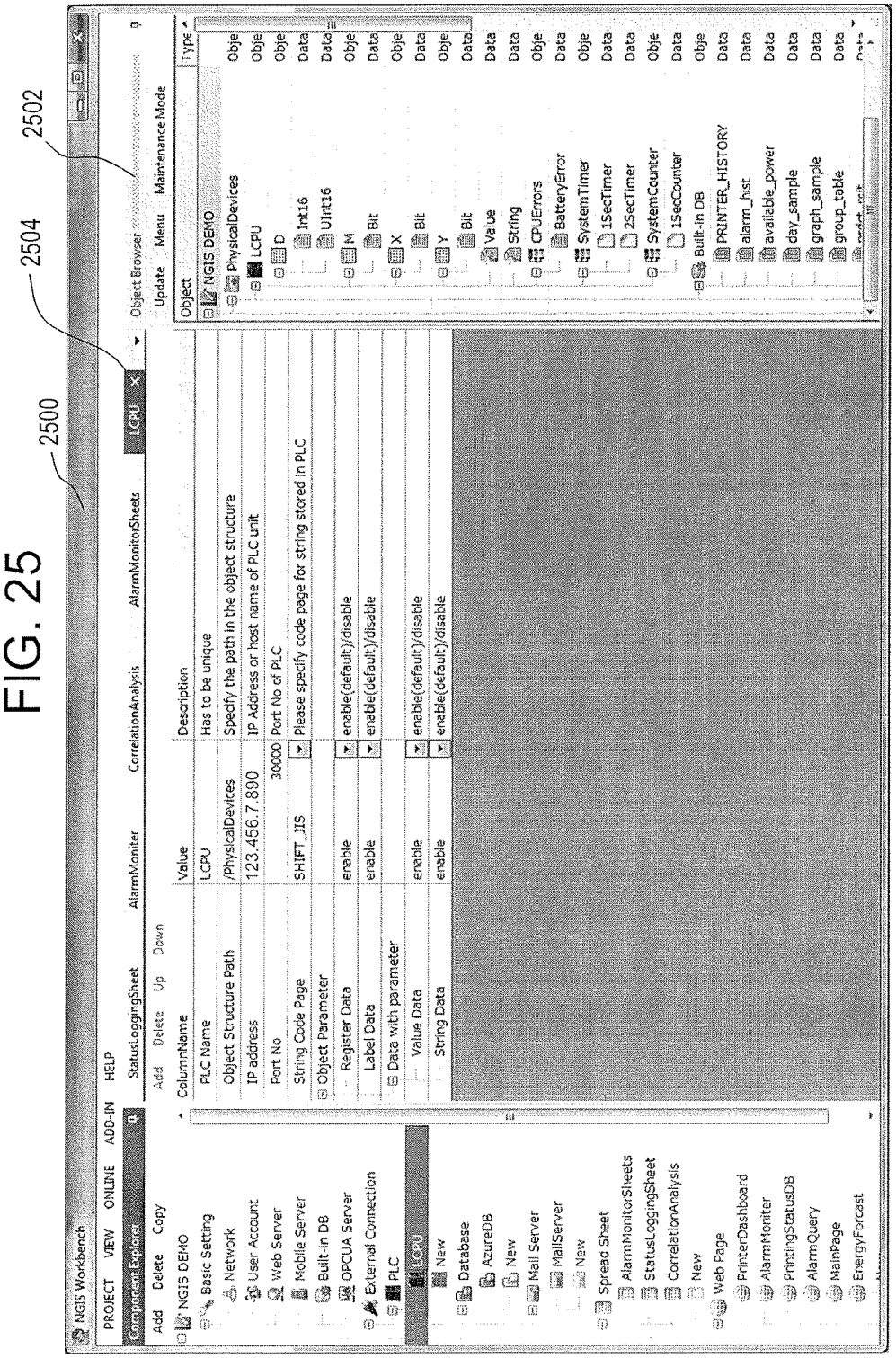

The first feature is a data model that enables a user to use the same simple technique to access and manipulate data from various types of external devices, such as a sequencer, a database, a mail server, etc. According to an exemplary embodiment, the term "data model" is a general term which refers to an object model which is described with data and is arranged to have a data structure which logically arranges the data. A data model may include all of the data that can be extracted from a machine, including internal statistics and records kept by the machine, and other types of data stored by the machine. Examples of the data models (the first feature) are shown in FIGS. 19, 24 and 25. The data model 1900 shown in FIG. 19 is represented as "Object Browser". As shown in FIG. 24, the screen 2400 includes a data model 2402 ("Object Browser") which is an example of a data model related to a database (e.g., "AzureDB"), and further includes a configuration of access 2404 which enables access to the database Azure DB. Also, the screen 2500 includes a data model 2502 ("Object Browser") which is an example of a data model related to a CPU (e.g., "LCPU"), and further includes a configuration of access 2504 which enables access to LCPU. The data models 1900, 2402 and 2502 are used to organize information related to different types of hardware. Many different types of data models are possible, and can be used with information indicating a status of factory automation (FA) devices such as the exemplary information 1700 (FIG. 17) and 1800 (see FIG. 18). Although FIGS. 19, 24 and 25 exemplarily illustrates the "Object Browser" as a data model, it is understood that exemplary embodiments are not limited to using the "Object Browser" as a data model, and the data model may be implemented in many other ways, both visually and logically.

Figure 20:
FIG. 20 is an example of warning information according to an exemplary embodiment.
Figure 21:
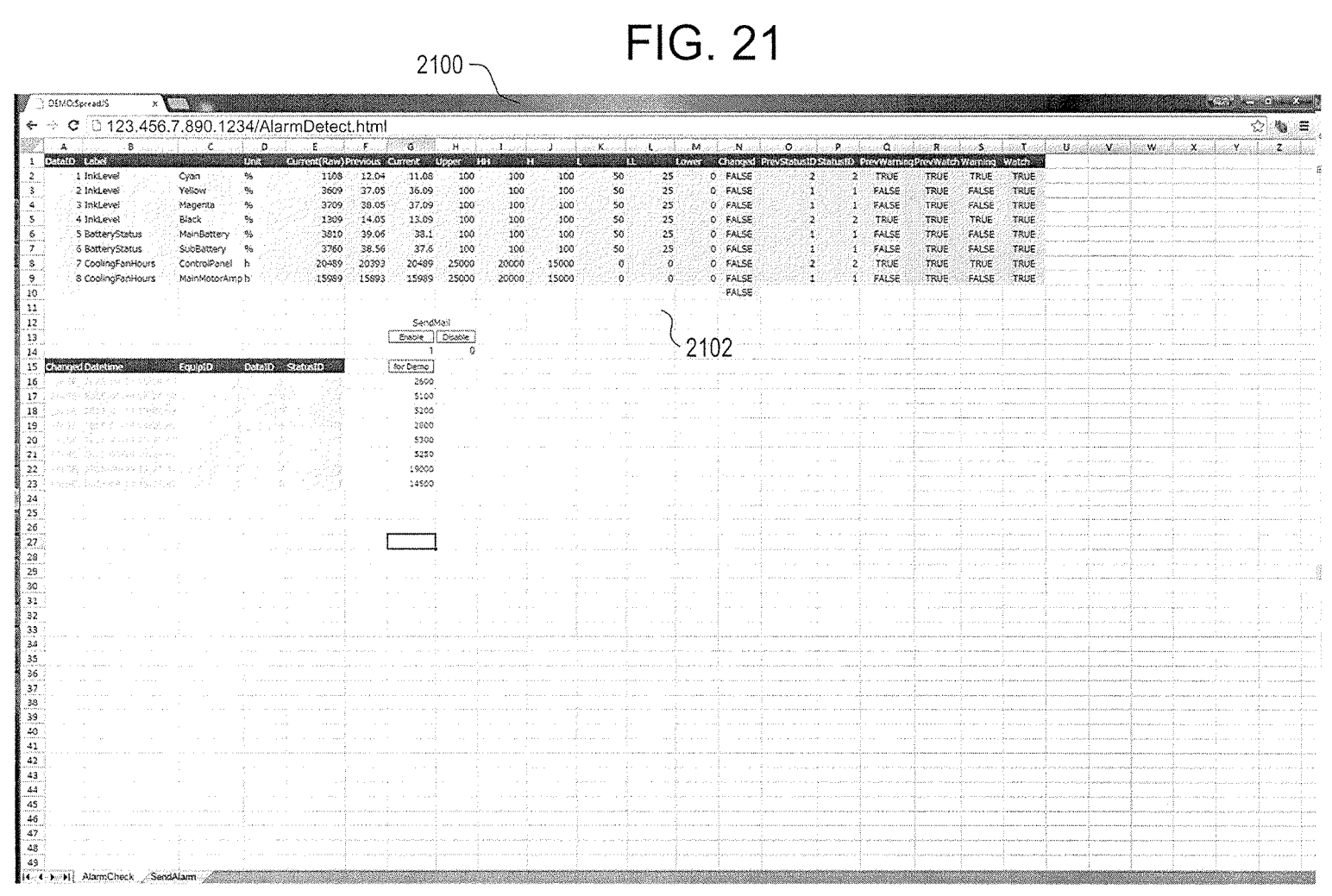
Figure 22:
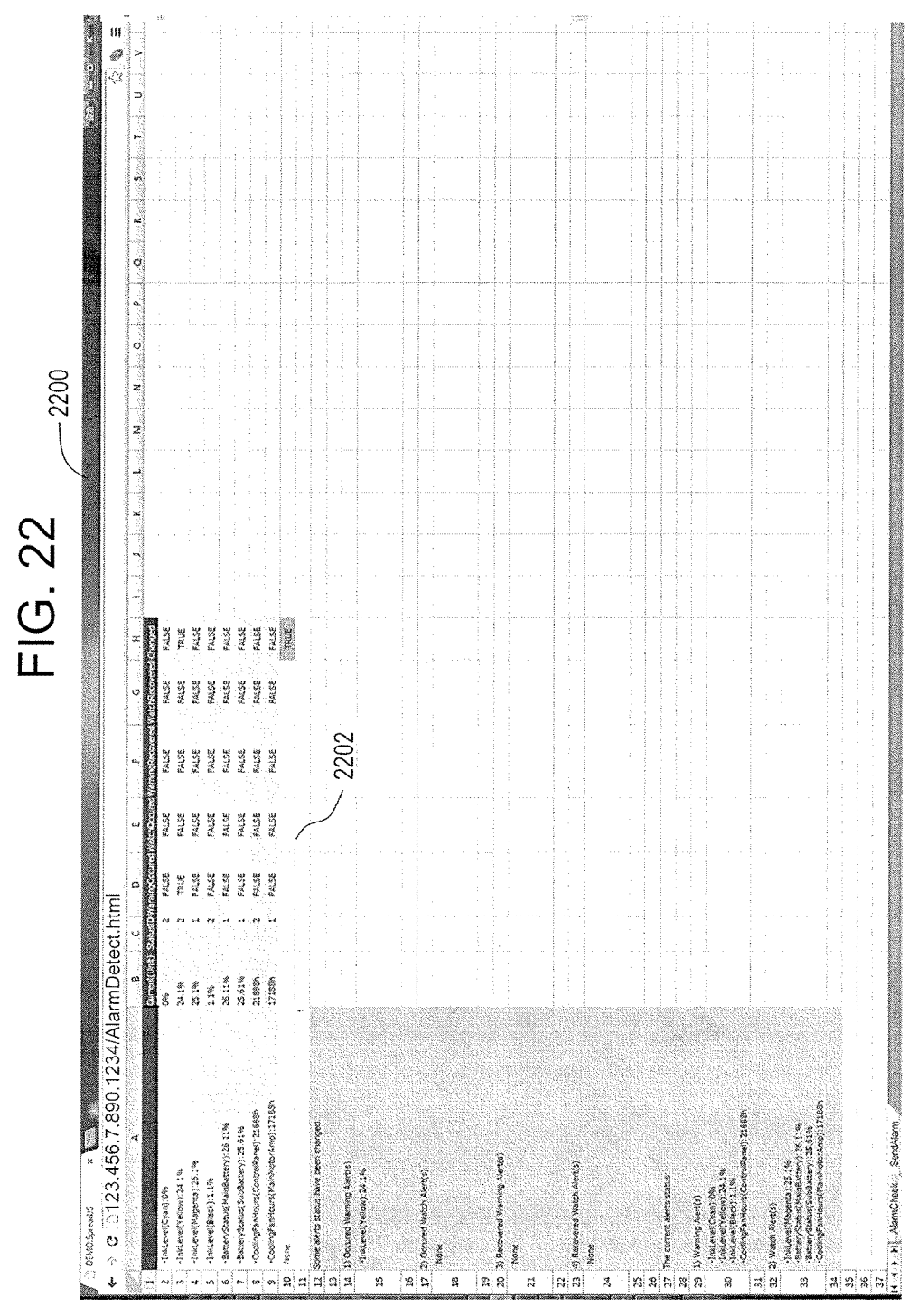
Figure 23:
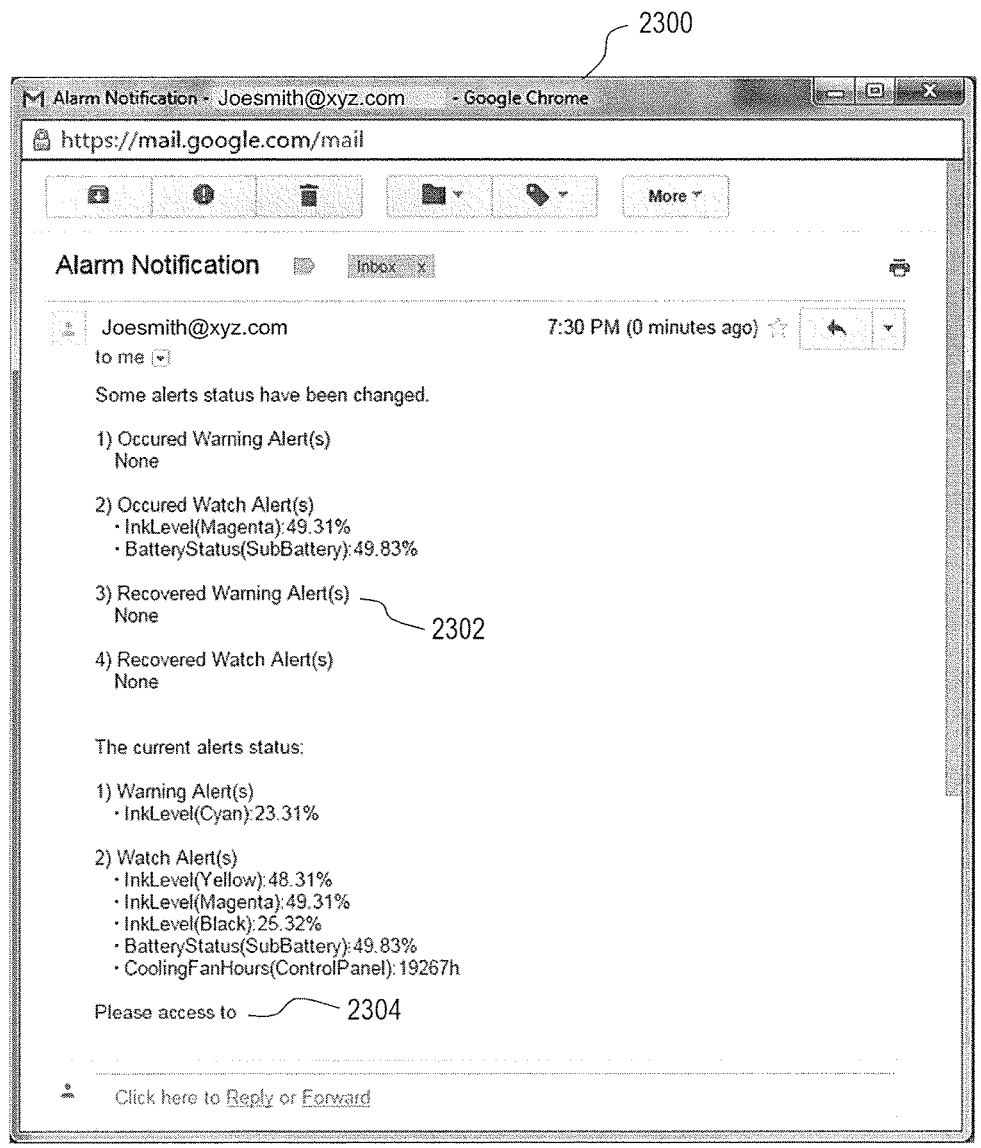
FIG. 23 is an email according to an exemplary embodiment.

The second feature is a spreadsheet which enables a user to easily write a program to process information or transfer information between the databases, or to visualize data. An example of spreadsheet screens generated by the Web-based system according to an exemplary embodiment is shown in FIGS. 21-22. The screen generated in FIG. 21 is a spreadsheet that is exemplarily referred to as "Alarm Check" mode and includes status information 2102 indicating the status of various types of devices (e.g., ink levels, battery status, and cooling fan hours). The screen generated in FIG. 22 is a spreadsheet exemplarily referred to as "Send Alarm" mode and includes warning information 2202 indicating the status of warning levels for the various types of devices. The screen generated in FIG. 23 is an email which includes email content 2302 which corresponds to the warning information 2202, to alert users of warning information by email. The email further includes a link 2304 which links to the spreadsheet shown in FIG. 22. FIG. 20 also shows warning information 2000.

In the screens shown in FIGS. 21 and 22, a user can move data not only from a database to cells shown in the screens, but can export data from the cells to the database. The user may also use input/output functions to calculate certain values and visually display items.

As shown in FIGS. 21-23, the spreadsheets may execute a program that will bring in values from an external apparatus (e.g., a sequencer, a printer, a machine tool, personal electronic devices, home appliances, etc.) to detect abnormalities in various types of devices. The abnormality detection program is performed through the calculations in the spreadsheet. All of the current status data may be inserted into one of the columns (e.g., column E in FIG. 21), and the Web-based system will compare the current status data to previous or normal values to detect a difference. The result of the abnormality detection program can be sent as output to mail servers; as an example, the email may output a message indicating the result of the abnormality detection. As shown in FIG. 23, the actual mail content seen by the email recipient is connected to the spreadsheet via the link 2304. The actual email content may include a message indicating the existence of an abnormality, as well as the specific value of an abnormality (e.g., an abnormality in the cooling fan, abnormality in the ink levels, etc). As a result, people who operate the Web-based system do not need to know C language to stay apprised of abnormalities.

Figure 26:
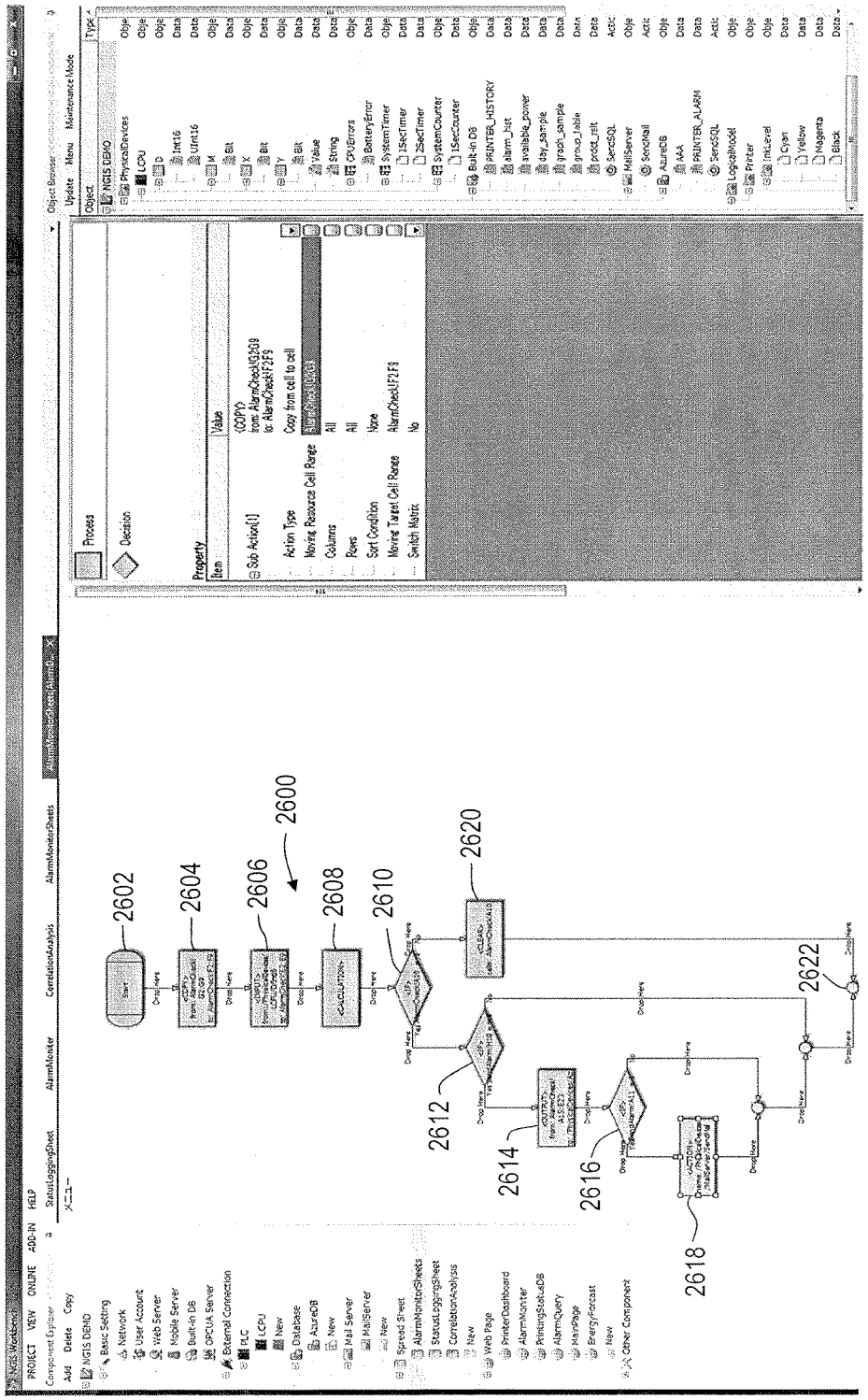
FIG. 26 is an example of a flowchart according to an exemplary embodiment.

The third feature is a flowchart to supplement and enhance the spreadsheet, noting that the spreadsheet has certain strengths and weaknesses. An example of a flowchart generated by the Web-based system according to an exemplary embodiment (the third feature) is shown in FIG. 26. The spreadsheet (e.g., FIGS. 21-22) has certain advantages and disadvantages. For example, the spreadsheet has the advantage of being able to perform calculations in an efficient manner, and the disadvantage that it may be difficult to determine the priority or sequence of calculations using only the spreadsheet. In other words, a spreadsheet is disadvantageous for causation, i.e., if→then operations. The flowchart can control functions of a spreadsheet, such as execution of calculations, data input from a data model, and data output to a data model. Flowcharts are beneficial because spreadsheets may not be able to describe calculation timing or data input/output functionality. The Spreadsheet should be provided with data and an execution trigger. In the case of Excel, the timing may be defined by default as the time a user inputs data. However, in the case of actual devices, it may be necessary or desired to define specific timings instead of a default timing when a user inputs data, since the processing is not operated by a person. Accordingly, by combining the second and third features, a user may be able to more easily process and manipulate data received from and/or transmitted to external devices (e.g., FA devices).

It is understood that exemplary embodiments are not limited to using a flowchart, and may instead use a setting table, or some other mechanism to describe relationships between operations and information (e.g., lists, grids, etc.).

As shown in FIG. 26, the flowchart 2600 includes a series of operations to process data. In operation 2602, the data processing operation begins. In operation 2604, data is copied from one column to another column in the spreadsheet. For example, data is copied from cells G2-G9 ("Current") and inserted into cells F2-F9 ("Previous") in the spreadsheet of FIG. 21. In operation 2606, data is input from physical devices. For example, data is input from LCPU to cells E2-E9 ("Current (Raw)") in the spreadsheet of FIG. 21). In operation 2608, a calculation is performed. For example, an abnormality detection is performed based on a comparison of "Current (Raw)" data to "Previous" data. In operation 2610, if the value in column A10 in the spreadsheet of FIG. 22 equals 1, the process moves to operation 2612, and otherwise, the value in column A10 is cleared (operation 2620) and the process ends (operation 2622). In operation 2612, if the value in column H10 is "TRUE" ("SendAlarm!"), then the process proceeds to operation 2614, and otherwise, the process ends (operation 2622). In operation 2614, an Alarm Check including information of the actual device (e.g., columns A15-E23 in FIG. 21) is output. In operation 2612, if the value in column A11 equals one, then the process proceeds to operation 2618, and an email, such as the email described above with respect to FIG. 23 which includes the results of the calculation in operation 2608 as the content of the email, is output, and otherwise, the process ends (operation 2622).

According to an exemplary embodiment, trigger timings can be set by a user to perform certain operations at predetermined intervals. For example, a trigger timing can be set by a user to perform certain operations of FIG. 26 at predetermined intervals (e.g., 1 second, 5 seconds, 10 seconds, 1 minute, 1 hour, etc.).

Additionally, according to other exemplary embodiments, the user may interact with the flowchart without using the spreadsheet, in which case the script generation process is modified to omit portions of the script related to the spreadsheet.

According to an exemplary embodiment, the flowchart elements are configured to be manipulated by graphical operations (e.g., a drag and drop operation, etc.). For example, the various processes or decisions of the flowchart can be rearranged or otherwise modified using the drag and drop operation or other types of operations. Additionally, data can be inserted into the flowchart elements in various ways. For example, in operation 2604, to change the range of cells from G2-G9 to another cell range, a user can select the box representing operation 2604 and type in a different range of cells. According to an exemplary embodiment, the cell range selection dialog may work similarly or the same as that of MICROSOFT EXCEL®.

By implementing these three features, the Web-based system according to an exemplary embodiment enables FA engineers to construct a system for information processing without needing to know any programming languages. According to an exemplary embodiment, the Web-based system is based on MICROSOFT EXCEL®, and thus, a user of the Web-based system may only need a basic familiarity with MICROSOFT EXCEL® to use the Web-based system. According to another exemplary embodiment, the Web-based system employs templates, and thus, a user of the Web-based system does not even need to be familiar with MICROSOFT EXCEL® to use the Web-based system.

Another benefit achieved by the Web-based system is that external devices and the internal processing operations are separate.

Overview of Hardware Structure of Web-Based System

Figure 27:
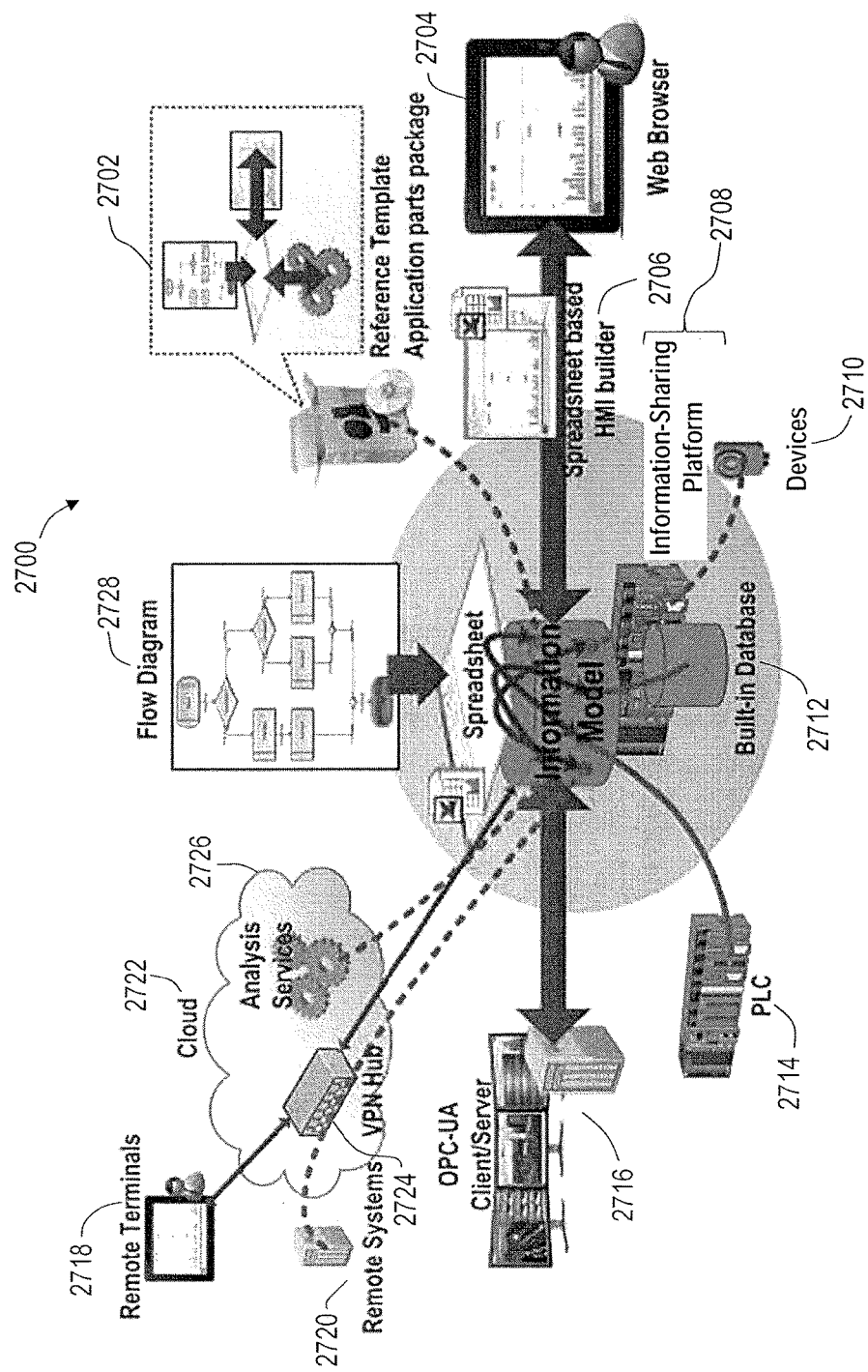
FIG. 27 is an example of the hardware structure of a Web-based system according to an exemplary embodiment.

FIG. 27 illustrates the hardware structure of a Web-based system according to an exemplary embodiment.

As shown in FIG. 27, the hardware structure 2700 includes a reference template application parts package 2702, a Web browser 2704, a Spreadsheet-based Human-machine interface (HMI) builder 2706, an information sharing platform 2708, devices 2710 (e.g., devices having data models which are already defined with a profile or a standardization method), a built-in database 2712, a programmable logic controller (PLC) 2714, an OPC-UA Client/Server 2716, remote terminals 2718, Remote system 2720, a Cloud 2722, and analysis services 2726. The information sharing platform 2708 may be implemented as hardware, software, or a combination thereof and may be provided as many different types (e.g., a combination of hardware devices and development code, etc). Furthermore, the devices 2710 may be of many different types, such as printers, ink level sensors, cooling fans, assembly line equipment, personal electronic devices, home appliances, etc.

For example, when the information sharing platform 2708 is implemented as a factory automation (FA) device, the information sharing platform 2708 may be implemented as a programmable logic controller, a C Controller (generic open platform controller that can execute C language type programs based on the MELSEC system architecture), a Graphic Operation Terminal (GOT) which is a type of human-machine interface (HMI), a computerized numerical controller (CNC), or other types of FA devices. As another example, when the information sharing platform 2708 is implemented as a non-FA device, the information sharing platform 2708 may be implemented as a point-of-sale (POS) terminal. It is understood that the information sharing platform 2708 may be implemented as many other types of devices as well.

Each of these hardware devices may be configured to interact with each other in many different ways to utilize features of the exemplary embodiments. For example, the reference template application parts package 2702, Web browser 2704, and spreadsheet based HMI builder 2706 may be used to generate the flow diagram and spreadsheet 2728. Furthermore, the remote terminals 2718 and remote systems 2720 may access the flow diagram and spreadsheet 2728 via the cloud 2722 to thereby process data and control factory automation (FA) devices. Furthermore, it is understood that these hardware devices are exemplary only, and many different types of hardware devices instead of, or in addition to, the hardware devices shown in FIG. 27 may be used in accordance with the exemplary embodiments. For example, the Web-based system can be implemented into a sequencer. As another example, the Web-based system can be implemented as a specially configured combination of hardware and software included in a PC, a tablet device, or a smart phone. The exemplary embodiments may utilize a combination of microprocessors, memory devices, storage devices, Ethernet ports, or devices that can communicate with other devices based on the IP protocol. Many other combinations of hardware and software are possible according to other exemplary embodiments.

The Web-based system according to exemplary embodiments may be implemented in any one or a combination of these different hardware devices.

Figure 28:
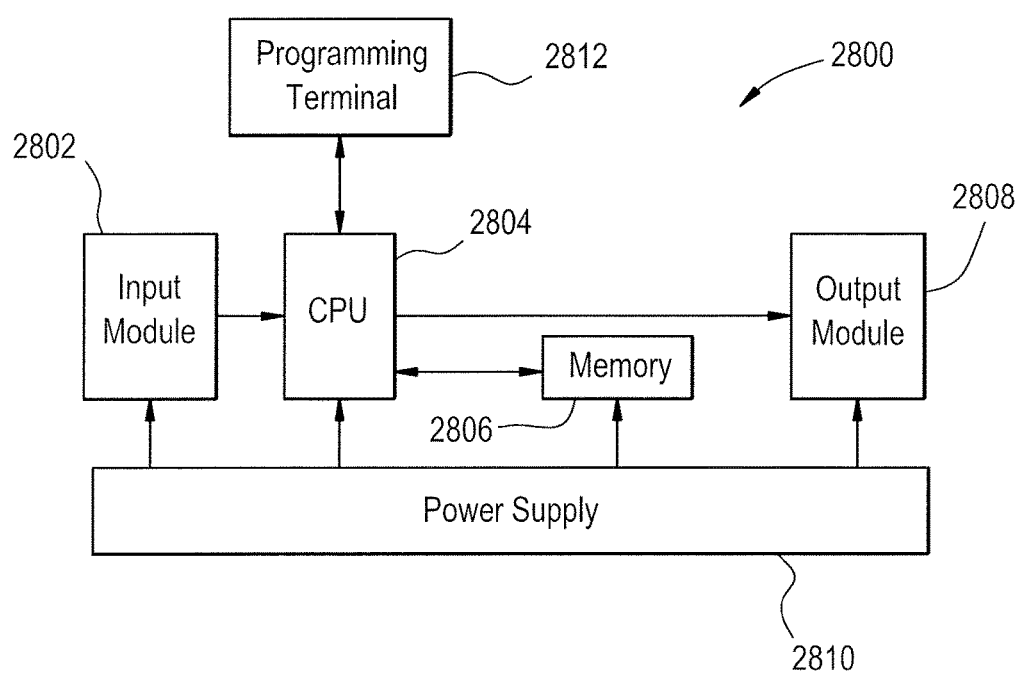
FIG. 28 is an example of a hardware device which implements an aspect of the Web-based system according to an exemplary embodiment.

FIG. 28 is an example of a hardware device which implements an aspect of the Web-based system according to an exemplary embodiment. As shown in FIG. 28, the hardware device 2800 includes an input module 2802 which receives input (e.g., data indicating a status of a machine), a central processing unit (CPU) 2804 which performs designated processes and controls the overall operations of the hardware device 2800, a memory 2806 which stores the received input as well as other data, programs, and other types of information, an output module 2808 which outputs results of processes performed by the CPU 2804, and a power supply 2810 which supplies power to the input module 2802, the CPU 2804, the memory 2806, and the output module 2808. The CPU 2804 communicates with an external programming terminal 2812, and the hardware device 2800 may thus be programmed using the programming terminal 2812. Although FIG. 28 exemplarily illustrates the input module 2802 and the output module 2808 as different modules, the input module 2802 and the output module 2808 may be implemented within the same module according to some exemplary embodiments.

According to an exemplary embodiment, the hardware device 2800 may be implemented as a programmable logic controller (PLC), although is not limited thereto. According to other exemplary embodiments, the hardware device 2800 may be implemented as many types of devices other than a PLC, such as home automation system devices, smart phones, tablets, cameras, automotive devices, etc. One skilled in the art would understand that the hardware device 2800 may be implemented in many different ways.

Overview of Logical Structure of Web-Based System

FIG. 1 illustrates an overview of the structure of a Web-based system according to several of the exemplary embodiments. As described below, certain particular exemplary embodiments are differentiated from each other in that each exemplary embodiment may use a unique combination of certain processing units of the Web-based system shown in FIG. 1, depending on the particular functions and purpose of the exemplary embodiment. It is understood that the various exemplary embodiments can be combined in many different ways, as would be appreciated by one of ordinary skill in the art. For example, different combinations of processing units shown in FIGS. 1-15 may be combined in many different ways to achieve many different functions.

As shown in FIG. 1, the Web-based system 100 includes an actual device 102 (e.g., PLC module) and an engineering tool 140 (e.g., PC, tablet, smart phone, or other computing device).

The engineering tool 140 includes an editor of flowchart 142 (e.g., "flowchart editor"), an editor of spreadsheet 144 (e.g., "spreadsheet editor"), an editor of structure of data model 146 (e.g., "data model structure editor"), an editor of configuration of access to external device 148 (e.g., "external device access configuration editor"), a generator of Web display file 150 (e.g., "Web display file generator"), an executable module file generator 151, and a manager of information for data model 154 (e.g., "data model information manager").

The editor of flowchart 142 is configured to generate and edit a flowchart. An example of a flowchart to be edited is the flowchart 2600 exemplarily shown in FIG. 26, although exemplary embodiments are not limited thereto, and many different types of flowcharts may be created and edited. To edit the flowchart, the editor of flowchart 142 receives input from a user using an input device (e.g., keyboard, touch screen, etc.) connected to the engineering tool 140, and edits the flowchart based on the received input, as described above in connection with FIG. 26. The editor of flowchart 142 is further configured to generate a configuration of process sequence 156 (e.g., "process sequence configuration") based on the edited flowchart.

The configuration of process sequence 156 describes the details of the flowchart, in other words, the details of the sequence of events to be performed during data processing operations. The details of the sequence of events may include, for example, the number of operations and transitions in the flowchart, the relationships between the operations and the transitions, the specific conditions which determine the output at certain operations in the flowchart, and various other features of the flowchart. The editor of flowchart 142 is further configured to transmit the configuration of process sequence 156 to the editor of spreadsheet 144.

The editor of spreadsheet 144 is configured to edit a spreadsheet based on the received configuration of process sequence 156 and a received configuration of entire data model 162 (e.g., "entire data model configuration"). An example of the spreadsheets to be edited are the spreadsheets 2100 and 2200 exemplarily shown in FIG. 21-22, although exemplary embodiments are not limited thereto, and many different types of spreadsheets may be edited. The editor of spreadsheet 144 edits the spreadsheet based on the edited flowchart. For example, if the flowchart is edited to change which cells are used during a calculation, the editor of spreadsheet 144 correspondingly changes the cells used during the calculation. The editor of spreadsheet 144 is further configured to generate a configuration of spreadsheet 158 (e.g., "spreadsheet configuration") including information indicating the edits to the spreadsheet, and to transmit the configuration of spreadsheet 158 and 160 to the generator of Web display file 150 and the executable module file generator 151. The configuration of spreadsheets 158 and 160 may be formatted differently from each other. For example, the configuration of spreadsheet 160 may be optimized for internal processing, whereas the configuration of spreadsheet 158 may be optimized for use with a GUI.

The editor of structure of data model 146 is configured to edit the structure of a data model. The data model provides a path to access the data. Examples of the data model are described above in connection with FIGS. 24 and 25, although exemplary embodiments are not limited thereto. To edit the data model, the editor of structure of data model 146 receives input from a user using an input device (e.g., keyboard, touch screen, etc.) operatively connected to the engineering tool 140, and edits the data model based on the received input. For example, if a new machine is added to factory operations (e.g., a printer, a CPU, a mail server), the new machine can be added to the data model based on a simple operation by a user. Furthermore, a user can reuse or recycle a data model that is already constructed. For example, a user can add a new printer by copying and editing a currently existing printer data model. The editor of structure of data model 146 is further configured to transmit a structure of configuration of data model 164 (e.g., "data model configuration structure") to the manager of information for data model 154.

The manager of information for data model 154 is configured to receive the structure configuration of data model 164 from the editor of structure of data model 146 and to receive the data model of each external device 176 from the executor accessing external device 110. Based on the structure configuration of data model 164 and the data model of each external device 176, the manager of information for data model 154 is configured to generate and transmit the configuration of entire data model 162 (e.g., entire data model configuration) to the editor of spreadsheet 144. The manager of information for data model 154 is further configured to transmit the configuration of entire data model 174 to the driver solver 108. The configuration of entire data models 162 and 174 may be formatted differently from each other. For example, the configuration of entire data model 162 may be a subset of the configuration of entire data model 174, with the configuration of entire data model 174 having all of the information about all of the data models of each external device, whereas the configuration of entire data model 162 may have information for references purposes only.

The editor of configuration of access to external device 148 is configured to receive a definition of configuration of access to external device 166 (e.g., "external device access configuration definition"). Based on the definition of configuration of access to the external device 166, the editor of configuration of access to external device 148 is further configured to generate and transmit the configuration of access to external device 178 (e.g., "external device access configuration") to the executor accessing external device 110.

The generator of Web display file 150 is configured to generate Files for Web display 170 (e.g., "Web files") based on the received configuration of spreadsheet 158 from the editor of spreadsheet 144, and transmit the generated Files for Web display 170 to the Web server 104.

The executable module file generator 151 is configured to receive the configuration of spreadsheet 160. The executable module file generator 151 is further configured to generate the module file for execution 171 based on the configuration of spreadsheet 160 and transmit the generated module file for execution 171 to the executor of module file 105. To generate the module file from spreadsheet data, the executable module file generator 151 performs the following sequence of operations. First, the executable module file generator 151 sorts the order of calculations by solving reference dependencies between cells. Next, the executable module file generator 151 converts spreadsheet functions (e.g., Excel functions), such as, for example, "SUM", to the functions that the target module file has or functions implemented on an execution environment of the target module file. Third, the executable module file generator 151 writes down the functions with the order solved at the first operation. The module file for execution 171 is an executable module file which enables access to external devices using the data model. In some exemplary embodiments, the executable module file is implemented as a script (e.g., text). In this case, the executable module file generator 151, module file for execution 171, and executor of module file 105 may be exemplarily described and illustrated as a generator of script file for execution 152, a script file for execution 172, and an executor of script 106, respectively. However, exemplary embodiments are not limited to the executable module file being a script, and throughout the exemplary embodiments, the executable module file may be implemented as many types of files other than a script, such as a Java class file (intermediate code), a machine code, etc. Thus, the executable module file according to exemplary embodiments may be configured as a file compatible at many different levels (high levels, intermediate levels, low levels, etc.), and may be executable on a specific platform.

The actual device 102 includes a World-Wide Web (e.g., "Web") server 104, an executor of module file 105 (e.g., "module file executor"), a processor accessing a data model (e.g., "driver solver"), and an executor accessing an external device 110 (e.g., "external device executor"). The actual device 102 may, for example, be implemented as the hardware device 2800 (see FIG. 28), and, in this case, may include the CPU 2804 which may be specially configured to control the performance and functionality of the web server 104, the executor of module file 105, the driver solver 108, the executor accessing external device 110, and/or other components, as described in more detail below.

The Web server 104 is configured to communicate with a Web client 190. The Web server 104 is configured to transmit files for Web display 192 to the Web client 190, receive a request message 194 from the Web client 190, and transmit Response data 196 back to the Web client 190. The request message 194 may be, for example, used as part of an application programming interface (API) to request device data, and the response data 196 may also be used as part of the API and may be, for example, for obtaining the device data.

The executor of module file 105 is configured to execute the module file (e.g., list of commands that are executable by a certain program) based on the module file for execution 171. The executor of module file 105 is configured to receive a call 112 from the Web server 104 and transmit a result 114 back to the Web server 104. The executor of module file 105 is further configured to transmit a request 116 to the driver solver 108 and to receive response data 118 from the driver solver 108. Similar to the request message 194 and the response data 196, the request 116 and the response data 118 may be part of an API to exchange data.

The driver solver 108 is configured to access a data model. The driver solver 108 is configured to receive the request 116 from the executor of module file 105, and send back the response data 118 to the executor of module file 105. The driver solver 108 is further configured to receive a request 124 from the Web server 104 and transmit response data 126 back to the Web server 104. The driver solver 108 is further configured to transmit a request 120 to the executor accessing external device 110 and receive response data 122 from the executor accessing external device 110. The driver solver 108 is further configured to receive the configuration of entire data model 174 from the manager of information for data model 154.

The executor accessing external device 110 is configured to receive the request 120 from the driver solver 108 and transmit the response data 122 back to the driver solver 108. The executor accessing external device 110 is further configured to transmit a request message 128 to the external device 180 and receive response data 130 from the external device 180. The request 120 may be, for example, a request for details regarding the external device 180 (e.g., identity of the external device 180, status of the external device 180, etc.), and the response data 122 may include the requested details. Similar to the request message 194 and the response data 196, the request 120 and the response data 122 may be part of an API to exchange data. The executor accessing the external device 110 may be implemented as a port configured to communicate with the external device 180. The executor accessing external device 110 is further configured to receive a configuration of access to external device 178 from an editor of configuration of access to external device 148.

First Exemplary Embodiment

FIG. 1 illustrates a Web-based system for processing data according to a first exemplary embodiment.

Generally, people use many types of electronic devices throughout their lives, for many purposes. For example, in a factory environment, factory workers may need to monitor or control factory automation (FA) devices. As another example, a homeowner may need to monitor certain appliances at his or her house, or a student may need to monitor certain electronic devices at school. However, many electronic devices lack computing resources, such as a Human-machine interface (HMI), which enable a user to monitor or control the device. As a result, in the related art, it may be very difficult or impossible to edit or control computer programs stored within electronic devices.

The first exemplary embodiment uses the combined functionality of the editor of spreadsheet 144, the executable module file generator 151, and the executor of module file 105, which work together to convert a spreadsheet editing result into a module file (e.g., module file for execution 171, such as a script) and to execute the module file. According to the related art, when a user edits and executes a spreadsheet using spreadsheet software, the editing and executing operations are combined together. However, in the Web-based system 100 according to the first exemplary embodiment, the result derived from a spreadsheet program executed in the engineering tool 140 is transformed into a module file (e.g., module file for execution 171) that can be executed in the actual device 102 (e.g., sequencer module), and the actual device 102 can execute the module file. Thus, editing and executing may be separately performed. As a result, a user can describe complicated arithmetic processing by editing the spreadsheet, and the arithmetic processing can then be executed separately in another device (e.g., a device without a display). Since the editing process and module file execution process are performed separately, a hardware which has rich resources, such as a personal computer (PC), can be utilized for editing, and another device which does not have rich resources can execute the edited module file. It is noted that the devices to execute the edited module file may have certain beneficial features, such as increased processing power or bandwidth, low-latency, or direct access to device data.

It is understood that, when the module file is implemented as a "script", the term "script" as used herein broadly refers to an intermediate communication medium used between the editing and execution processes. For example, the script may be an executable module file configured to be executed in an execution environment of a controller in order for the controller to control a device. According to exemplary embodiments, many different types of scripts may be used (e.g., Lua, Javascript, etc.).

In the first exemplary embodiment, a processor, such as the CPU 2804 (FIG. 28) may be specially configured to control the performance of the editor of spreadsheet 144, the executable module file generator 151, and the executor of module file 105 when performing the above-described functions.

Second Exemplary Embodiment

Figure 2:
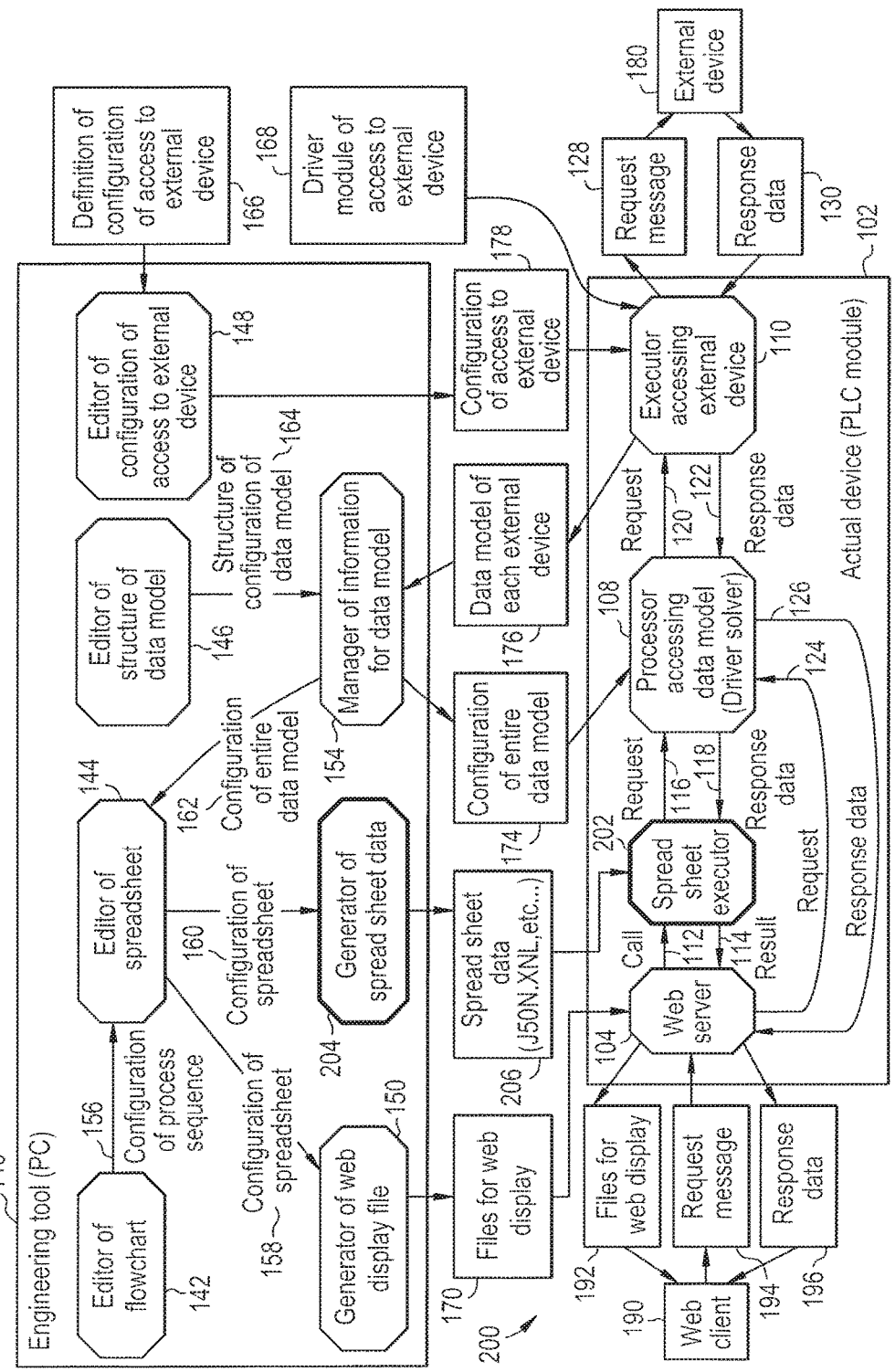
FIG. 2 is an illustration of a Web-based system for processing data according to a second exemplary embodiment.

FIG. 2 illustrates a Web-based system for processing data according to a second exemplary embodiment. The primary differences between the Web-based system 200 according to the second exemplary embodiment and the Web-based system 100 according to the first exemplary embodiment is that the Web-based system 200 according to the second exemplary embodiment includes a generator of spreadsheet data 204 (e.g., "spreadsheet data generator") and a spreadsheet executor 202. The other components shown in FIG. 2 that have the same reference numerals as the components shown in previous figures may be identical to the components shown in the previous figures, and a detailed description thereof is omitted.

In the Web-based system 200, the generator of spreadsheet data 204 receives a configuration of spreadsheet 160 from the editor of spreadsheet 144 and generates spreadsheet data 206 based on the configuration of spreadsheet 160. The spreadsheet data 206 is defined by a data description language such as XML, JavaScript Object Notation (JSON), or another language known to those skilled in the art. The generator of spreadsheet data 204 then transmits the spreadsheet data 206 to the spreadsheet executor 202 which loads the spreadsheet data 206 and executes calculations.

A significant benefit of the second exemplary embodiment is that the result derived from a spreadsheet program executed in the engineering tool 140 is saved as data defined by a data description language (e.g., XML, JSON) and then transferred to the actual device 102 (e.g., sequencer module). Thus, unlike the Web-based system 100 according to the first exemplary embodiment which converts the spreadsheet data to a script, the spreadsheet executor 202 in the actual device 102 loads the data in the mark-up language (e.g., XML, JSON) and executes calculations and data which is input and output according to the saved data. Thus, it is not necessary to convert the spreadsheet data to a script (an intermediate script representation is not required).

Thus, according to the second exemplary embodiment, a script generation process is omitted. Furthermore, a data description language may be generated which includes a type of code executable by a device (e.g., a sequencer device), and data and the code may then be bundled together in such a way that an intermediate script representation is not required because the generated data description language can be executed directly.

Additionally, similar to the first exemplary embodiment, editing and executing may be separately performed. As a result, a user can describe complicated arithmetic processing using the spreadsheet, and the arithmetic processing can then be executed separately in another device (e.g., a device without a display).

In the second exemplary embodiment, a processor, such as the CPU 2804 (FIG. 28) may be specially configured to control the performance of the generator of spreadsheet data 204 and a spreadsheet executor 202 when performing the above-described functions.

Third Exemplary Embodiment

Figure 3:
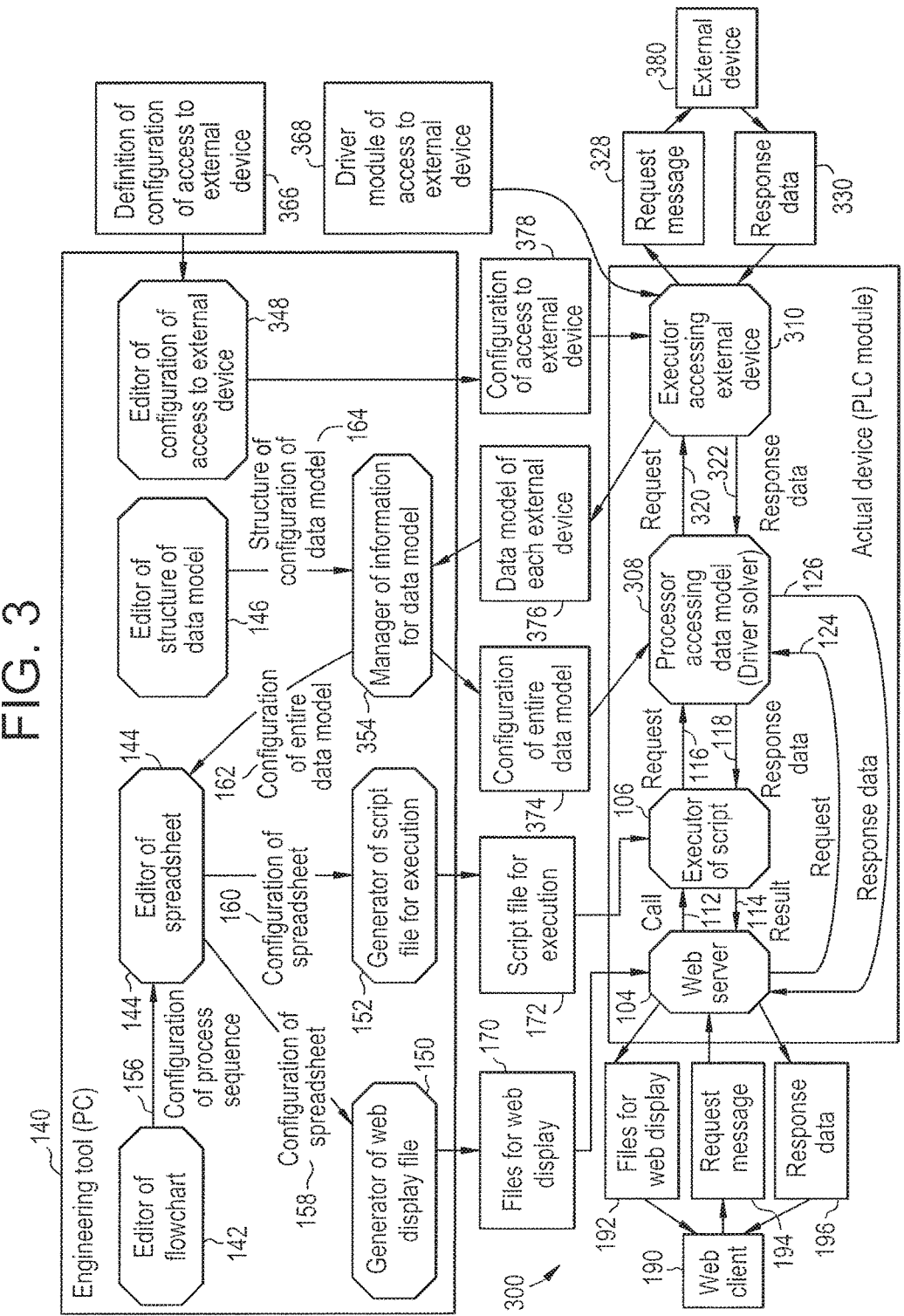
FIG. 3 is an illustration of a Web-based system for processing data according to a third exemplary embodiment.

FIG. 3 illustrates a Web-based system for processing data according to a third exemplary embodiment. The primary differences between the Web-based system 300 according to the third exemplary embodiment and the Web-based system 100 according to the first exemplary embodiment is that the Web-based system 300 according to the third exemplary embodiment includes a processor accessing data model (e.g., driver solver) 308, an executor accessing external device 310, an editor of configuration of access to external device 348, and a manager of information for data model 354. The other components shown in FIG. 3 that have the same reference numerals as the components shown in previous figures may be identical to the components shown in the previous figures, and a detailed description thereof is omitted.

The editor of configuration of access to external device 348 is configured to receive a definition of configuration of access to external device 366. The definition of configuration of access to external device 366 may be provided in the form of an XML schema. The XML schema contains (1) information about an external device, and (2) information about files to be created. Based on the definition of configuration of access to the external device 366, the editor of configuration of access to external device 348 is configured to generate a configuration screen which is accessible to a user. The user sets an access definition by entering data into the generated configuration screen. The editor of configuration of access to external device 348 generates a configuration of access to external device 378 (e.g., access definition file) based on the access definition set by the user, and transmits the configuration of access to external device 378, along with a driver module of access to external device 368 (e.g., "external device access driver module"), to the executor accessing external device 310.

Although FIG. 3 exemplarily illustrates that the driver module of access to external device 368 may be separate from the actual device 102, the driver module of access to external device 368 may also be included within the actual device 102 according to some exemplary embodiments.

The executor accessing external device 310 is configured to receive the configuration of access to external device 378 and the driver module of access to external device 368. The executor accessing external device 310 may, for example, be implemented similarly to the executor accessing external device 110. The executor accessing external device 310 is configured to request device information about the external device 380, if the device information is unknown. The device information may be any type of information related to the external device 380, such as fixed information (e.g., identifying information of the external device 380), dynamically changing status information (e.g., power levels, performance information, cycles/sec, ink levels, memory storage levels, other settings), connectivity information (e.g., Wi-Fi, cellular, intranet, Internet, etc), location information, and other types of information. To request device information, the executor accessing external device 310 is configured to transmit a request message 328 requesting details regarding at least one external device 380 which corresponds to the XML schema, and receive a response data 330 including the details from the at least one external device 380. The response data 330 may indicate the types of data stored in the at least one external device 380 (e.g., sequencer has a register, DB has tables). The executor accessing external device 310 is further configured to generate a data model of each external device 376 based on the configuration of access to external device 378 and the response data 330 and transmit the generated data model of each external device 376 to the manager of information for data model 354. The executor accessing external device 310 may flexibly generate the data models of each external device 376 according to a variety of factors. For example, the executor accessing external device 310 may be configured to sort categories of data, decide where to put information within the data models, and freely change the mapping. If the data definition is stored in the external device 380, the driver module of access to external device 368 queries the external device 380. However, if the data definition of the external device 380 that the driver module 368 manages is fixed, the driver module 368 does not need to query the device, and can instead generate the data model internally.

The manager of information for data model 354 collects the generated date model of each external device 376 for each of at least one external device 380 and generates the configuration of entire data model 374. The configuration of the entire data model 374 may be visually presented, for example, as the object browser 2402 (see FIG. 24). The manager of information for data model 354 then transmits the generated configuration of entire data model 374 to the driver solver 308. The driver solver 308 transmits a request 320 to the Executor accessing external device 310 and receives response data 322 from the Executor accessing external device 310.

The driver solver 308 loads the configuration of entire data model 374 and, based on the loaded configuration of entire data model 374, generates an interface to enable access to device data by executor accessing external device 310. When a user edits the configuration of entire data model 374, the driver solver 308 will determine which external device should be used, and will access that device.

A significant benefit of the third exemplary embodiment is that both the definition of configuration of access to external device 366 and the driver module of access to external device 368 may be added into the Web-based system 300. Another significant benefit of the third exemplary embodiment is that the Web-based system 300 realizes data access by employing the same operation scheme for a plurality of external devices. A manufacturer (e.g., a third party) may add a new schema or drivers and access various devices based on marketplace needs and other considerations.

In the third exemplary embodiment, a processor, such as the CPU 2804 (FIG. 28) may be specially configured to control the performance of the driver solver 308, the executor accessing external device 310, the editor of configuration of access to external device 348, and the manager of information for data model 354 when performing the above-described functions.

Fourth Exemplary Embodiment

Figure 4:
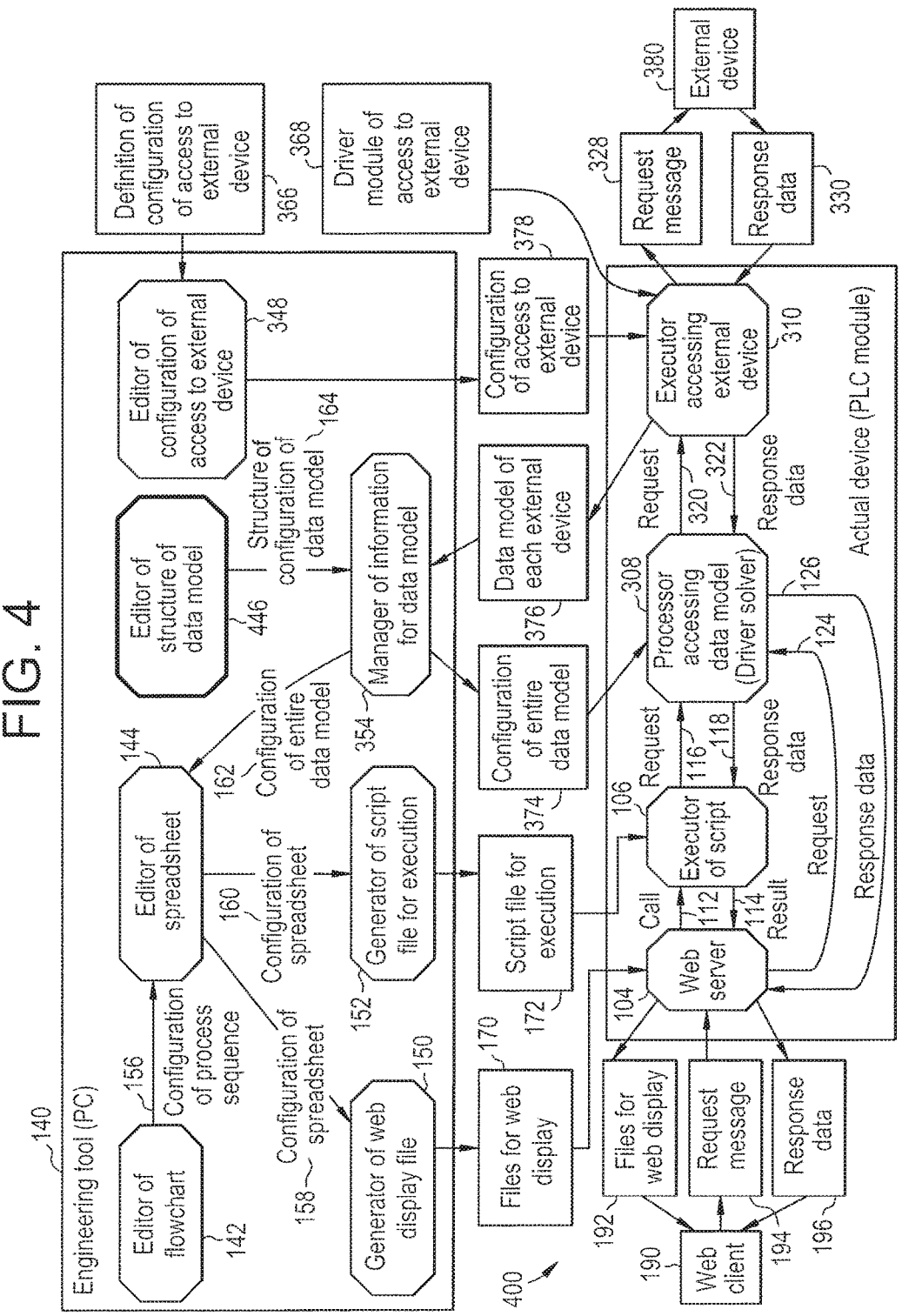
FIG. 4 is an illustration of a Web-based system for processing data according to a fourth exemplary embodiment.

FIG. 4 illustrates a Web-based system for processing data according to a fourth exemplary embodiment. The primary differences between the Web-based system 400 according to the fourth exemplary embodiment and the Web-based system 300 according to the third exemplary embodiment is that the Web-based system 400 according to the fourth exemplary embodiment further includes an editor of structure of data model 446 (e.g., "data model structure editor"). The other components shown in FIG. 4 that have the same reference numerals as the components shown in previous figures may be identical to the components shown in the previous figures, and a detailed description thereof is omitted.

The editor of structure of data model 446 is configured to edit the structure of a data model. To edit the data model, the editor of structure of data model 446 receives input from a user using an input device (e.g., keyboard, touch screen, etc.) connected to the engineering tool 140, and edits the data model based on the received input.

A significant benefit of the fourth exemplary embodiment is that the editor of structure of data model 446 may improve the management of data by enabling a user to organize and re-configure data.

In the fourth exemplary embodiment, a processor, such as the CPU 2804 (FIG. 28) may be specially configured to control the performance of the editor of structure of data model 446 when performing the above-described functions.

Fifth Exemplary Embodiment

Figure 5:
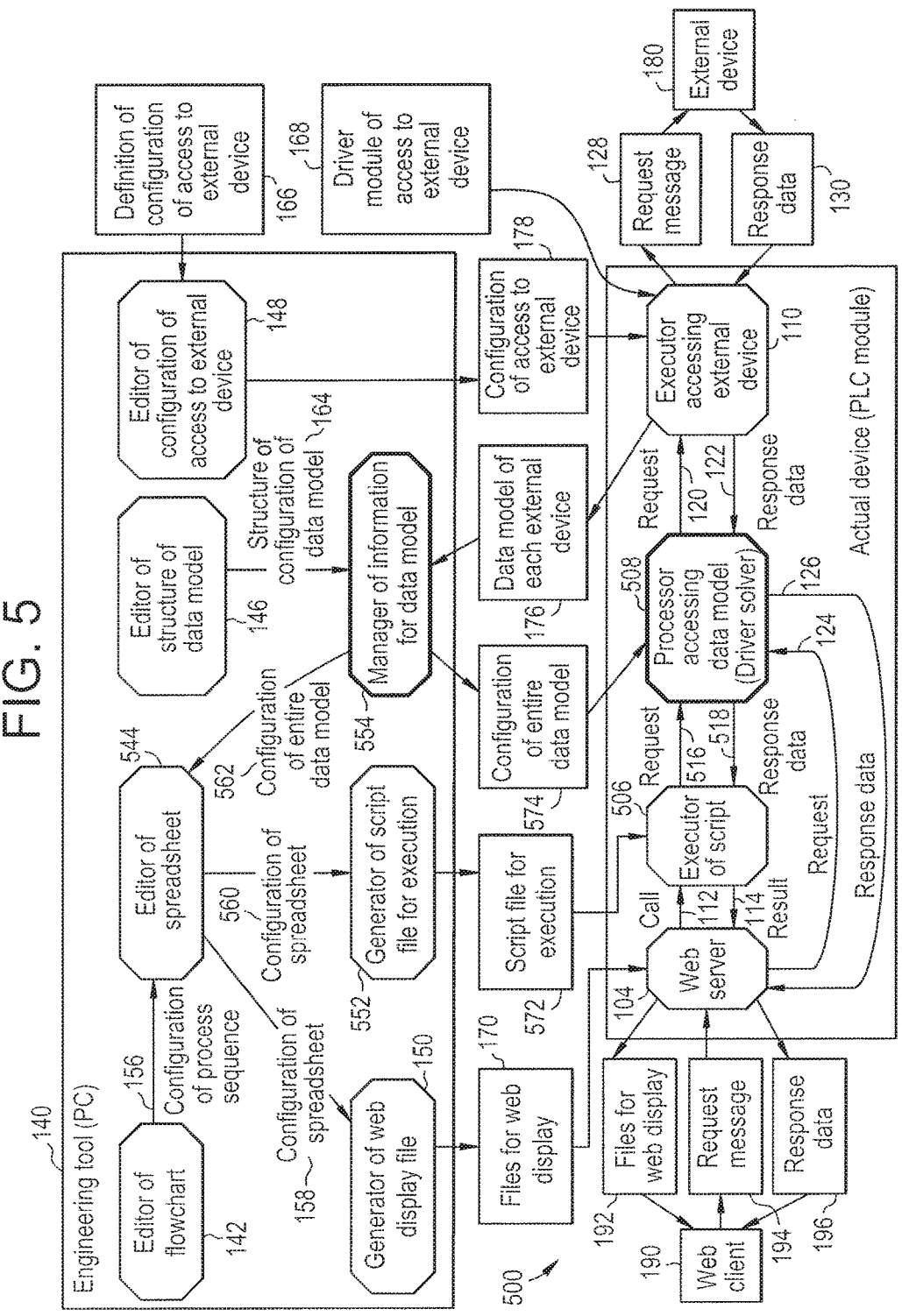
FIG. 5 is an illustration of a Web-based system for processing data according to a fifth exemplary embodiment.

FIG. 5 illustrates a Web-based system for processing data according to a fifth exemplary embodiment. The Web-based system 500 according to the fifth exemplary embodiment combines features of the Web-based system 100 according to the first exemplary embodiment (or the Web-based system 200 according to the second exemplary embodiment) and features of the Web-based system 300 according to the third exemplary embodiment. The other components shown in FIG. 5 that have the same reference numerals as the components shown in the previous figures may be identical to the components shown in the previous figures, and a detailed description thereof is omitted.

The Web-based system 500 includes an executor of script 506, a driver solver 508, an editor of spreadsheet 544, a generator of script file for execution 552, and a manager of information for data model 554.

The editor of spreadsheet 544 is configured to receive a configuration of entire data model 562 from the manager of information for data model 554 and generate a configuration of spreadsheet 560 based on both user input and the configuration of entire data model 562. The manager of information for data model 554 is configured to generate a configuration of entire data model 574.

The generator of script file for execution 552 is configured to receive the configuration of spreadsheet 560 and generate the script file for execution 572 based on the received configuration of spreadsheet 560. The generator of script file for execution 552 is further configured to transmit the script file for execution 572 to the executor of script 506.

The executor of script 506 is configured to execute a script (e.g., list of commands that are executable by a certain program) based on the script file for execution 572. Also, as a result of executing the script, the executor of script 506 is configured to access external devices by transmitting a request 516 to the driver solver 508 and receiving response data 518 from the driver solver 508.

A significant benefit of the fifth exemplary embodiment is realizing a uniform and simple way to link a data processing operation with the external device data accessed by the driver solver 508.

In the fifth exemplary embodiment, a processor, such as the CPU 2804 (FIG. 28) may be specially configured to control the performance of the components described above when the components perform the above-described functions.

Sixth Exemplary Embodiment

Figure 6:
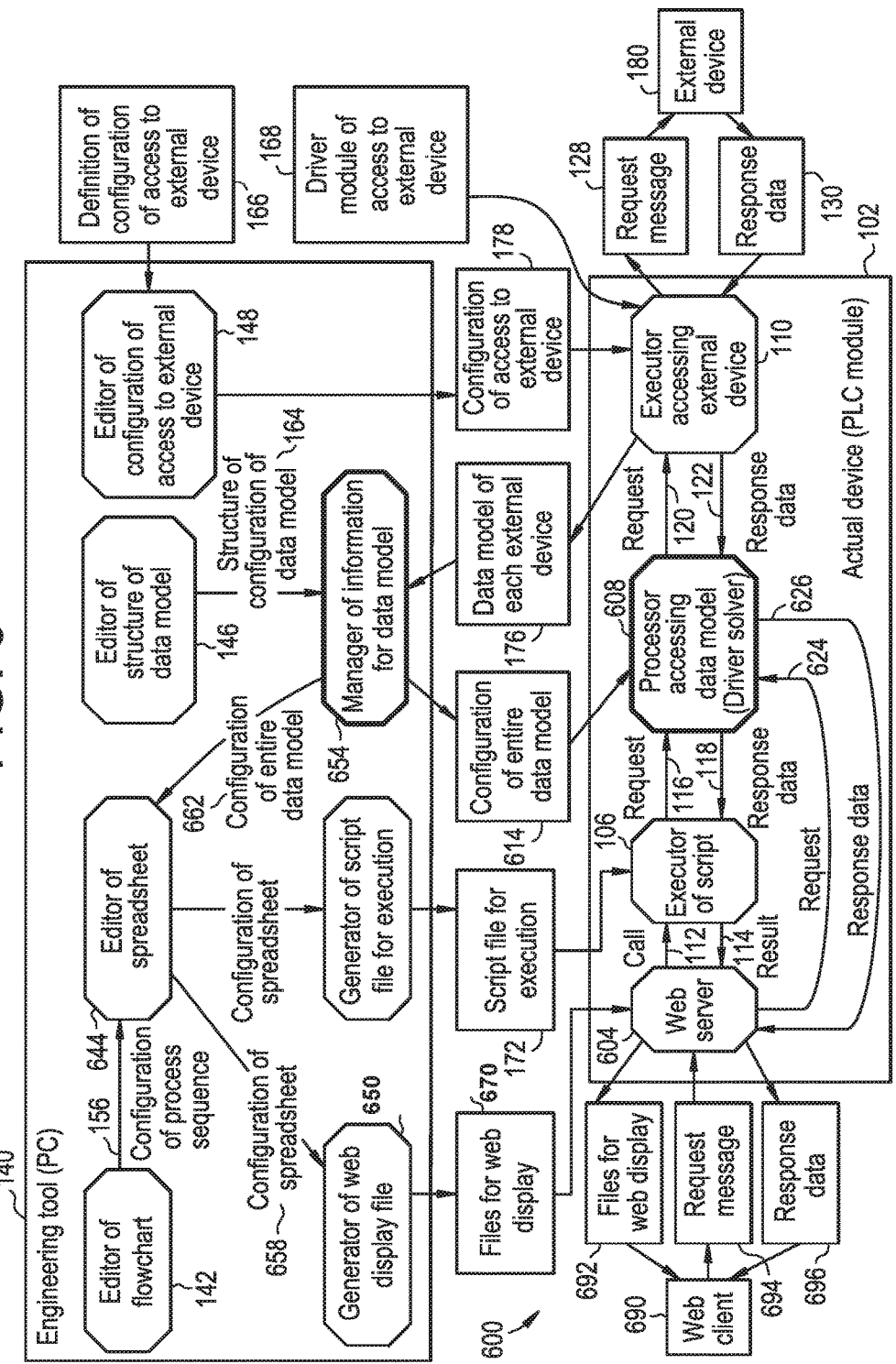
FIG. 6 is an illustration of a Web-based system for processing data according to a sixth exemplary embodiment.

FIG. 6 illustrates a Web-based system for processing data according to a sixth exemplary embodiment. The Web-based system 600 according to the sixth exemplary embodiment includes a Web server 604, a driver solver 608 which receives a configuration of entire data model 614, an editor of spreadsheet 644, a generator of Web display file 650, and a manager of information for data model 654. The other components shown in FIG. 6 that have the same reference numerals as the components shown in the previous figures may be identical to the components shown in FIG. 1, and a detailed description thereof is omitted.

The editor of spreadsheet 644 is configured to receive a configuration of entire data model 662 from the manager of information for data model 654, generate a configuration of spreadsheet 658 based on the received configuration of entire data model 662, and transmit the generated configuration of spreadsheet 658 to the generator of web display file 650. The generator of web display file 650 is configured to generate files for Web display 670 based on the configuration of spreadsheet 658 and transmit the files for Web display 670 to the Web server 604. The Web server 604 is configured to transmit the files for Web display 692 to the Web client 690, and the Web client 690 is configured to communicate with the Web server 604 using the request message 694 and the response data 696.

A significant benefit of the sixth exemplary embodiment is realizing a uniform and simple way to link a data processing operation and a data visualization operation with the external device data accessed by the driver solver 608. A distinction between the sixth exemplary embodiment and the fifth exemplary embodiment is that, according to the sixth exemplary embodiment, the data processing result that is output from the spreadsheet is converted to the files for Web display 692 which can reach a Web browser through the Web server 604. The Web browser may display information based on the files for Web display, thereby enabling a user to view the displayed information and input commands into the Web browser. The input commands may then be sent back to the Web server 604, which will in turn access a data model through the driver solver 608. So, instead of the actual device 102 executing an action, the Web server 604 and Web client 690 will execute the action as a pair.

In the sixth exemplary embodiment, a processor, such as the CPU 2804 (FIG. 28) may be specially configured to control the performance of the Web server 604, the driver solver 608, the editor of spreadsheet 644, the generator of Web display file 650, and the manager of information for data model 654 when performing the above-described functions.

Seventh Exemplary Embodiment

Figure 7:
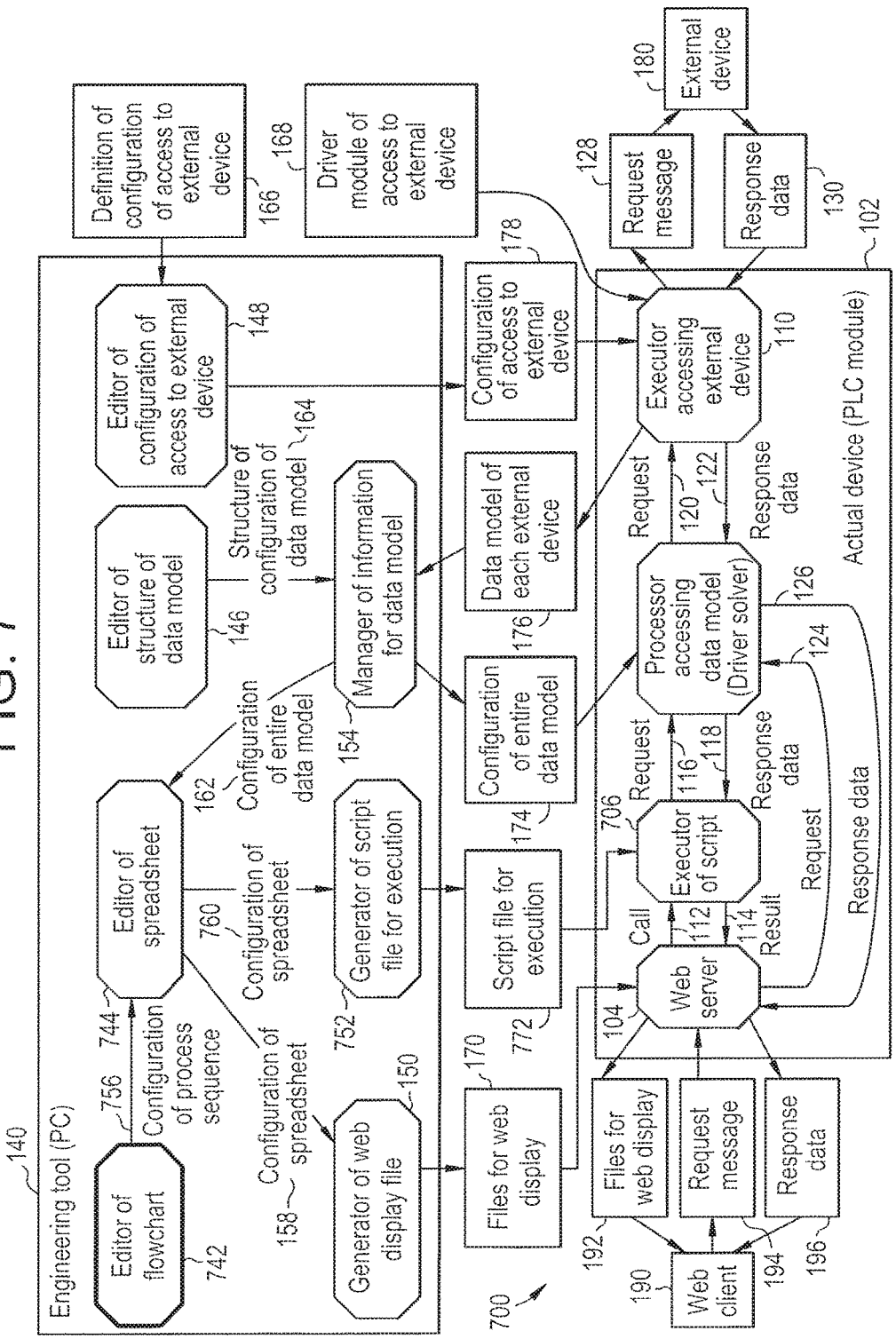
FIG. 7 is an illustration of a Web-based system for processing data according to a seventh exemplary embodiment.

FIG. 7 illustrates a Web-based system for processing data according to a seventh exemplary embodiment. The differences between the Web-based system 700 according to the seventh exemplary embodiment and the Web-based system 100 according to the first exemplary embodiment is that the Web-based system 700 according to the seventh exemplary embodiment adds the editor of flowchart 742. The other components shown in FIG. 7 that have the same reference numerals as the components shown in previous figures may be identical to the components shown in previous figures, and a detailed description thereof is omitted.

The editor of flowchart 742 is configured to generate and edit a flowchart. To edit the flowchart, the editor of flowchart 742 receives input from a user using an input device (e.g., keyboard, touch screen, etc.) connected to the engineering tool 140, and edits the flowchart based on the received input. The editor of flowchart 742 is further configured to generate a configuration of process sequence 756 based on the edited flowchart and transmit the configuration of process sequence 756 to the editor of spreadsheet 744.

The editor of spreadsheet 744 is configured to edit a spreadsheet based on the received configuration of process sequence 756, generate a configuration of spreadsheet 760 based on the edited spreadsheet, and transmit the configuration of spreadsheet 760 to the generator of script file for execution 752.

The generator of script file for execution 752 is configured to generate the script file for execution 772 based on the configuration of spreadsheet 760 and transmit the generated script file for execution 772 to the executor of script 706. The script file for execution 772 enables access to external devices using the data model.

The executor of script 706 is configured to execute script (e.g., list of commands that are executable by a certain program) based on the script file for execution 772.

An example of the operation of the seventh exemplary embodiment is provided below.

First, a user edits a flowchart 2600 (see FIG. 26). For example, when the external devices 180 are printers, the user sets a parameter that, if an ink level of any of the printers drops below 10%, a warning should be issued for the respective printer. To set the parameter, the user specifies the parameter in the flowchart, and further specifies the cells of the spreadsheet corresponding to the ink level status of the printers (e.g., cells G2-G9, see FIG. 21). The editor of flowchart 742 then generates a configuration of process sequence 756 based on the edited flowchart and transmits the configuration of process sequence 756 to the editor of spreadsheet 744, which in turn initiates the script generation process (as previously described) based on the configuration of process sequence 756.

A significant benefit of the seventh exemplary embodiment is that, since the editor of flowchart 742 is used to edit the flowchart, and since the editor of spreadsheet 744 edits the spreadsheet based on the edited flowchart, advanced data processing can be realized in a simple and effective manner.

In the seventh exemplary embodiment, a processor, such as the CPU 2804 (FIG. 28) may be specially configured to control the performance of the editor of flowchart 742 when performing the above-described functions.

Eighth Exemplary Embodiment

Figure 8:
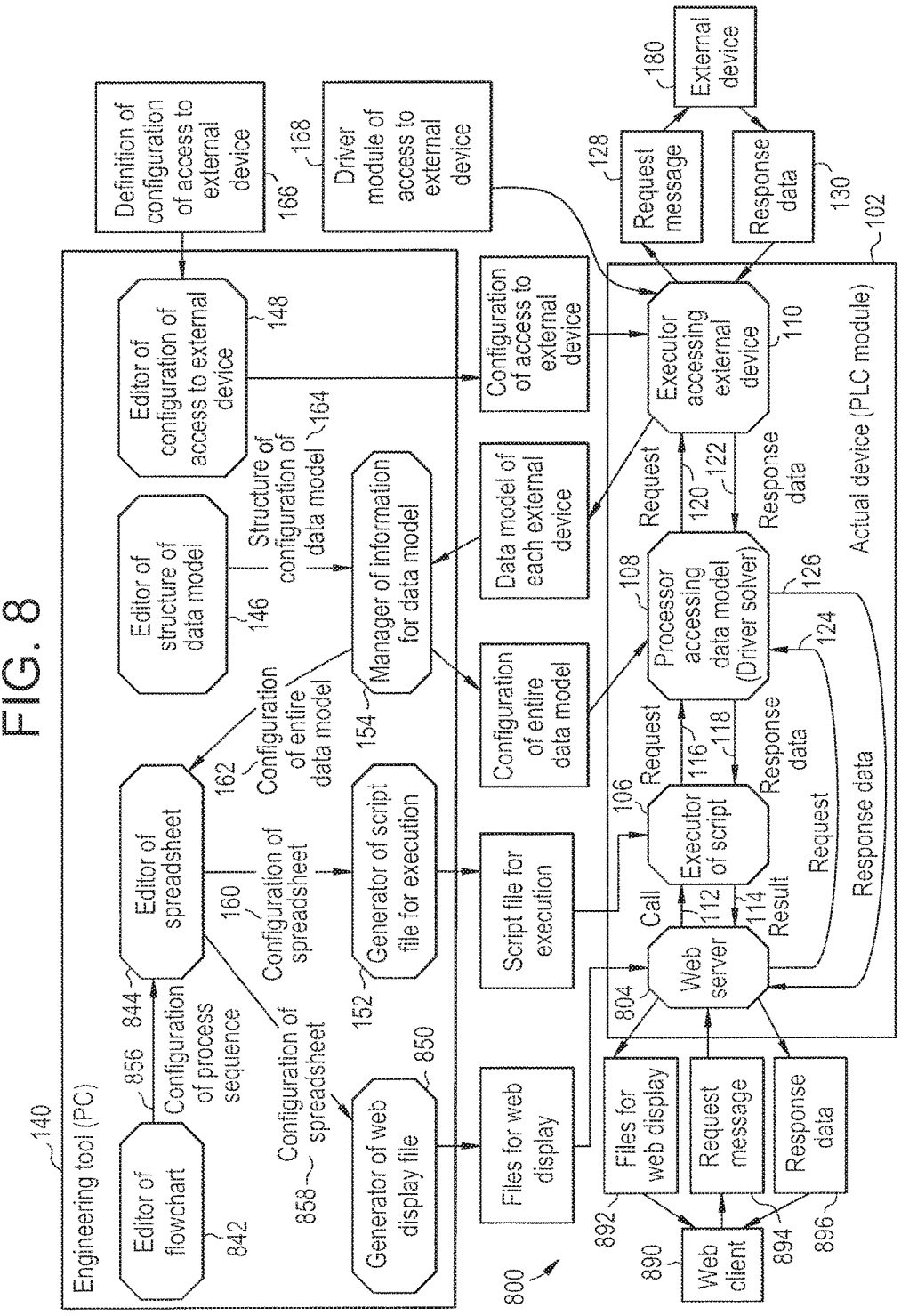
FIG. 8 is an illustration of a Web-based system for processing data according to an eighth exemplary embodiment.

FIG. 8 illustrates a Web-based system for processing data according to an eighth exemplary embodiment. The differences between the Web-based system 800 according to the eighth exemplary embodiment and the Web-based system 600 according to the sixth exemplary embodiment is that, in the Web-based system 800 according to the eighth exemplary embodiment, the editor of spreadsheet 844 is configured to generate the configuration of spreadsheet 858 based on a configuration of process sequence 856, whereas in the Web-based system 600 according to the sixth exemplary embodiment, the editor of spreadsheet 644 is configured to generate the configuration of spreadsheet 658 based on the configuration of entire data model 662. As a result, the flowchart can be used to transmit and receive data to and from the spreadsheet in a flexible manner, and order the spreadsheet calculations in a flexible manner. The other components shown in FIG. 8 that have the same reference numerals as the components shown in previous figures may be identical to the components shown in the previous figures, and a detailed description thereof is omitted.

The editor of flowchart 842 is configured to generate and edit a flowchart, generate a configuration of process sequence 856 based on the edited flowchart and transmit the configuration of process sequence 856 to the editor of spreadsheet 844.

The editor of spreadsheet 844 is configured to generate the configuration of spreadsheet 858 based on the configuration of process sequence 856, and transmit the configuration of spreadsheet 858 to the generator of Web display file 850.

The generator of Web display files 850 is configured to generate files for Web display 892 based on the configuration of spreadsheet 858 and transmit the files for Web display 892 to the Web server 804. The Web server 804 is configured to transmit the files for Web display 892 to the Web client 890, and the Web client 890 is configured to communicate with the Web server 804 using the request message 894 and the response data 896.

A significant benefit of the eighth exemplary embodiment is that advanced data processing and advanced data visualization can be realized in a simple and effective manner.

In the eighth exemplary embodiment, a processor, such as the CPU 2804 (FIG. 28) may be specially configured to control the performance of the above components when performing the above-described functions.

Ninth Exemplary Embodiment

Figure 9:
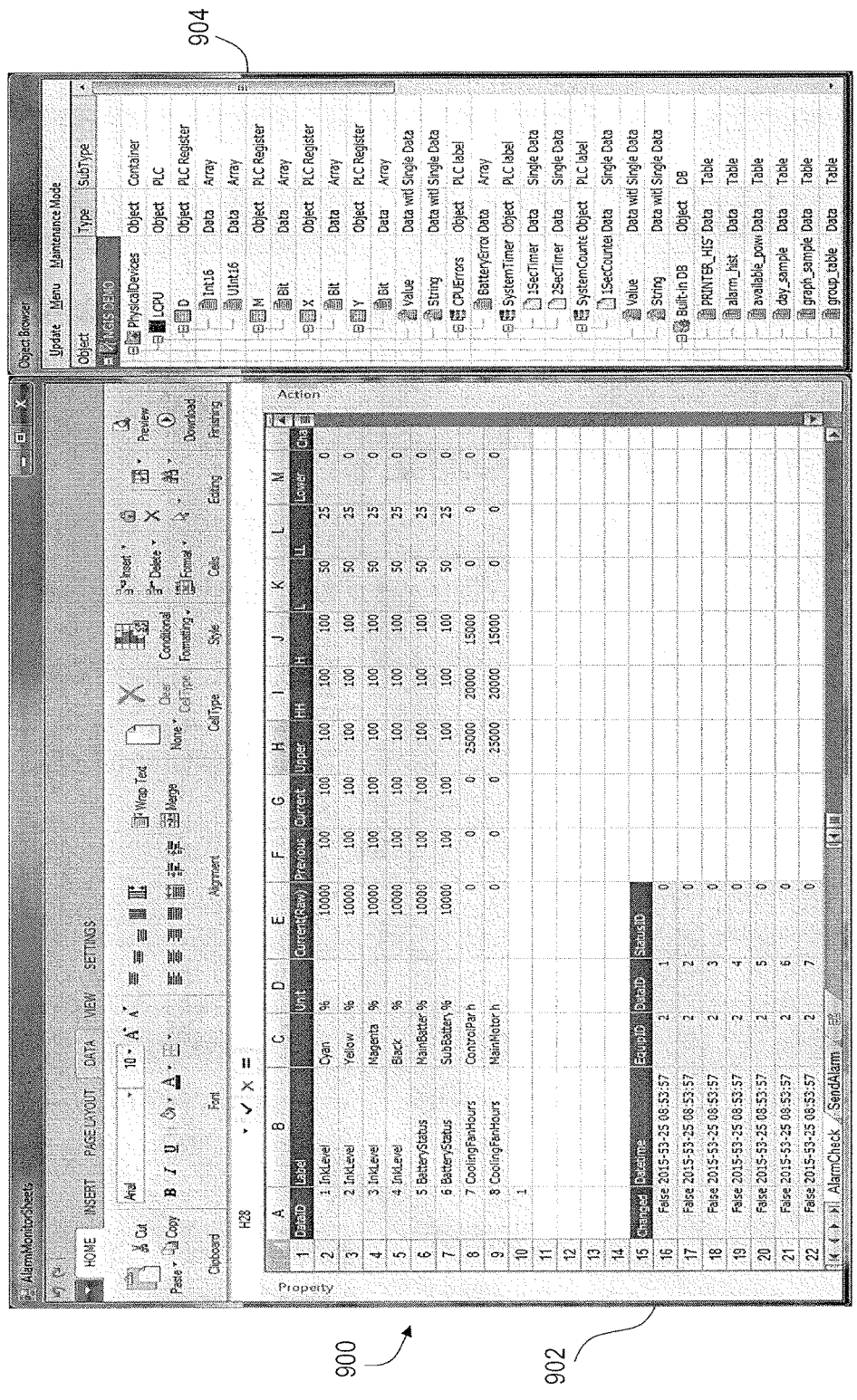
FIG. 9 is an illustration of a Web-based system for processing data according to a ninth exemplary embodiment.

FIG. 9 illustrates a Web-based system for processing data according to a ninth exemplary embodiment.

The Web-based system 900 according to the ninth exemplary embodiment is configured to display a spreadsheet 902 and a data model 904 at the same time. The spreadsheet 902 and data model 904 can be generated and edited according to any combination of the above-described first to eighth exemplary embodiments. According to an exemplary embodiment, the properties of flowchart parts or setting tables are used to set the linkage between the spreadsheet 902 and the data model 904.

A primary benefit of the ninth exemplary embodiment is to visualize, in a simple and effective manner, interactions between the spreadsheet 902 and the data model 904.

In the ninth exemplary embodiment, a processor, such as the CPU 2804 (FIG. 28) may be specially configured to control the performance of the components in the Web-based system 900 when performing the above-described functions, and a display of any type (e.g., CRT, LCD, OLED, etc.) may be implemented as part of the Web-based system 900, or alternatively, may be separate from the Web-based system 900.

Tenth Exemplary Embodiment

Figure 10:
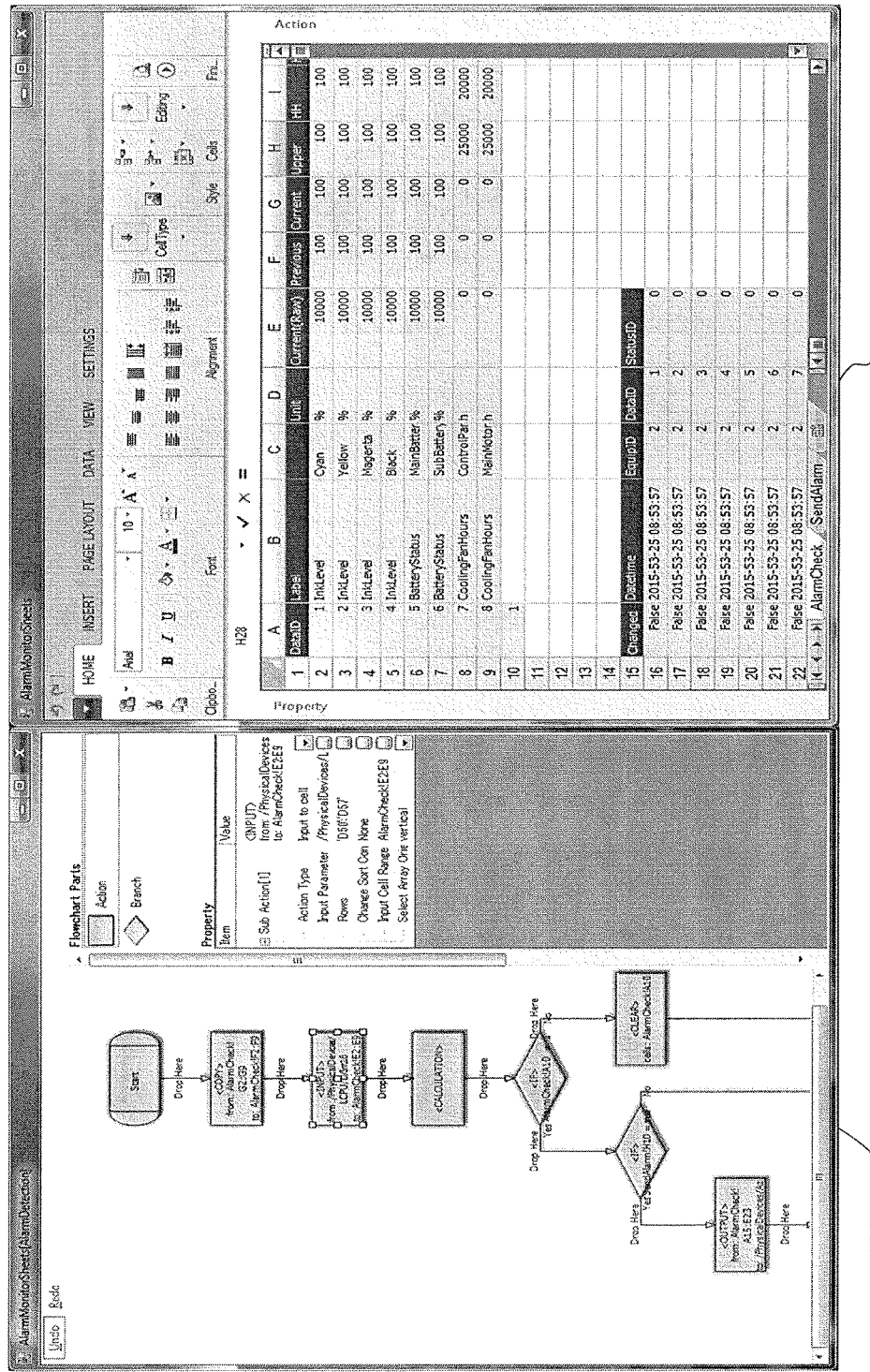
FIG. 10 is an illustration of a Web-based system for processing data according to a tenth exemplary embodiment.

FIG. 10 illustrates a Web-based system for processing data according to a tenth exemplary embodiment.

The Web-based system 1000 according to the tenth exemplary embodiment is configured to display a flowchart 1006 and a data model 1004 at the same time. The flowchart 1006 and data model 1004 can be generated and edited according to any combination of the above-described first to ninth exemplary embodiments. According to an exemplary embodiment, the properties of flowchart parts or setting tables are used to set the linkage between the spreadsheet flowchart 1006 and the data model 1004.

A primary benefit of the tenth exemplary embodiment is to visualize, in a simple and effect manner, interactions between the flowchart 1006 and the data model 1004.

In the tenth exemplary embodiment, a processor, such as the CPU 2804 (FIG. 28) may be specially configured to control the performance of the components in the Web-based system 1000 when performing the above-described functions, and a display of any type (e.g., CRT, LCD, OLED, etc.) may be implemented as part of the Web-based system 1000, or alternatively, may be separate from the Web-based system 1000.

Eleventh Exemplary Embodiment

Figure 11:
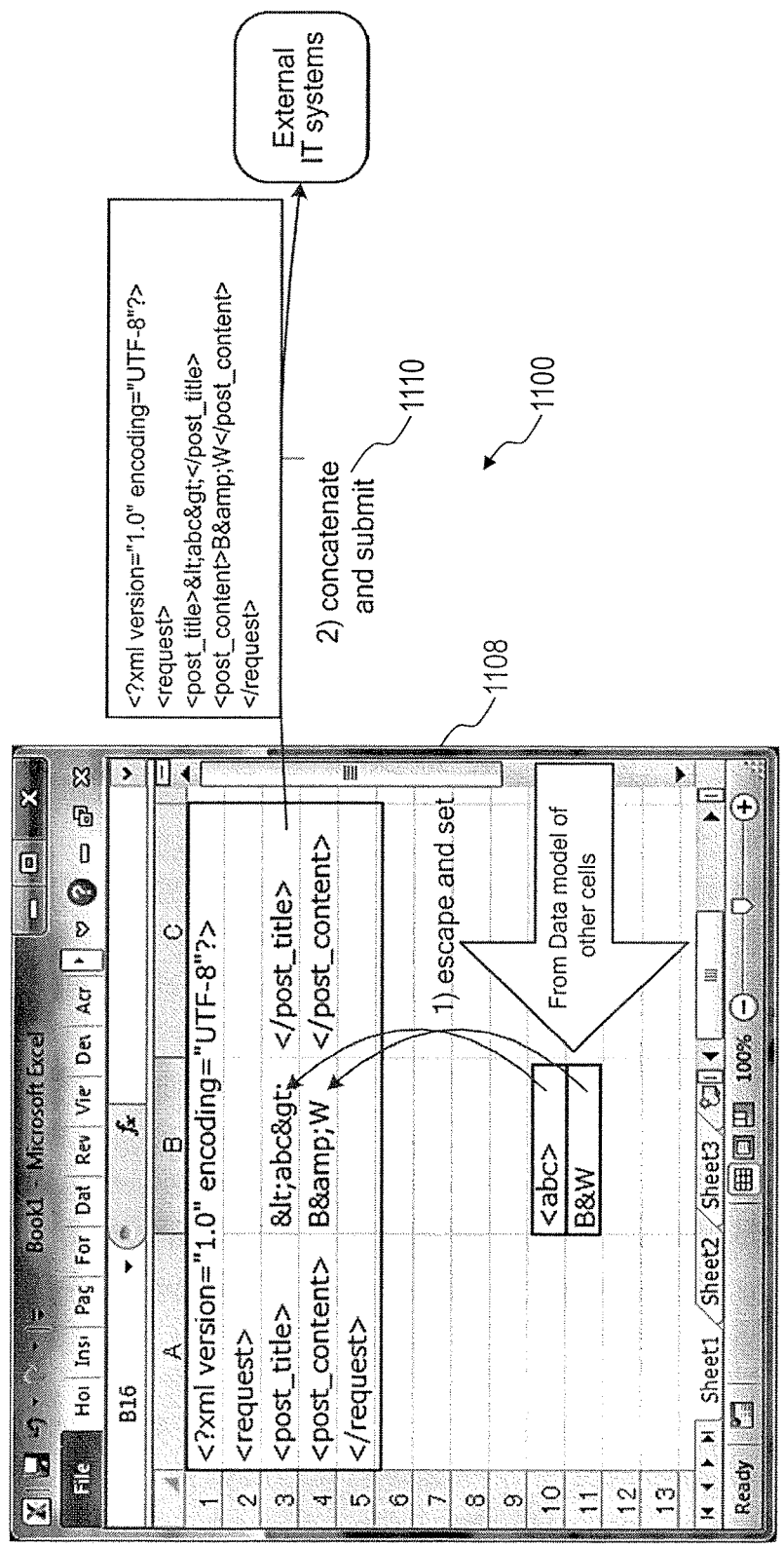
FIG. 11 is an illustration of a Web-based system for processing data according to an eleventh exemplary embodiment.

FIG. 11 illustrates a Web-based system for processing data according to an eleventh exemplary embodiment.

The Web-based system 1100 according to the eleventh exemplary embodiment assumes that the Web-based system 1100 is connected to an external system, such as an Information Technology (IT) system which uses, for example, XML. The Web-based system 1100 is configured to perform two primary functions, including a concatenation function to concatenate cells, and an escape function (also called a "convert" function) to convert letters that cannot be used in XML into a format that is XML-compliant. The Web-based system 1100 may be loaded into various components included in the above-described first to eighth exemplary embodiments, such as the editor of spreadsheet (e.g., editor of spreadsheet 144), the executor of module file (e.g., executor of module file 105), or the Web client (e.g., Web client 190) to generate messages.

As exemplarily shown in FIG. 11, the Web-based system 1100 may receive data from other cells (e.g., "<abc>" and "B&W"). However, certain characters, such as the characters "<", ">" and "&", included in the data may not be compatible with XML. Accordingly, the Web-based system 1100 first performs an escape function 1108 which converts the characters "<", ">" and "&" into XML-compatible characters, and then performs a concatenation function 1110 which concatenates the data together and submits the concatenated data to the external IT system.

A significant benefit of the Web-based system 1100 according to the eleventh exemplary embodiment is to provide a simple and effective manner of generating text-based messages which are compatible with computer languages of external systems, such as external IT systems. It is understood, of course, that the Web-based system 1100 is not limited to converting messages to XML, and may instead convert messages to many other types of computer languages, for example, JSON.

In the eleventh exemplary embodiment, a processor, such as the CPU 2804 (FIG. 28) may be specially configured to control the performance of the components in the Web-based system 1100 when performing the above-described functions, and a display of any type (e.g., CRT, LCD, OLED, etc.) may be implemented as part of the Web-based system 1100, or alternatively, may be separate from the Web-based system 1100.

Twelfth Exemplary Embodiment

Figure 12:
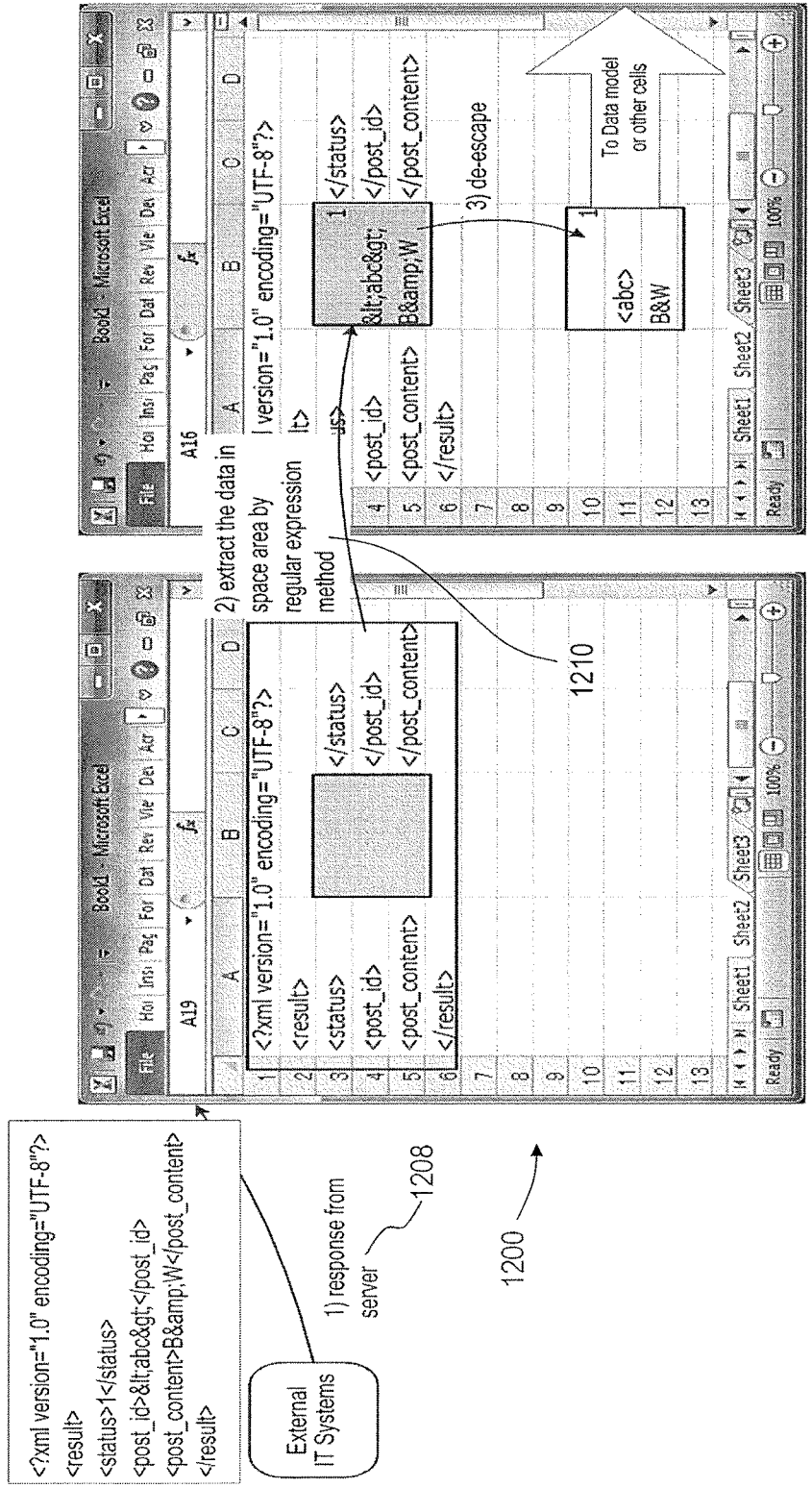
FIG. 12 is an illustration of a Web-based system for processing data according to a twelfth exemplary embodiment.

FIG. 12 illustrates a Web-based system for processing data according to a twelfth exemplary embodiment.

The Web-based system 1200 according to the twelfth exemplary embodiment performs the reverse functions of the Web-based system 1100 according to the eleventh exemplary embodiment. The Web-based system 1200 includes an extraction with regular expression function 1208 and a de-escape function 1210 (also referred to as a de-convert function).

First, the Web-based system 1200 receives a template including data from an external system (e.g., external IT system) and performs the extraction with regular expression function 1208 on the template to extract blank cells. The blank cells are specified by a user based on a user setting. The template is concatenated to regular expression strings, and the specified blank cells will be concatenated as special strings for pattern matching of regular expressions such as "(.)" so that the regular expression function can extract the corresponding data. Next, the Web-based system 1200 extracts the characters included in the blank cells and performs the de-escaping function 1210 on the characters included in the blank cells, to thereby convert the characters to a format usable with the data model. For example, the de-escaping function 1210 converts the characters from an XML format to a non-XML format which is usable with a data model. Next, the Web-based system 1200 transmits the converted characters to the appropriate location (e.g., a device or program controlling a data model).

A significant benefit of the Web-based system 1200 according to the twelfth exemplary embodiment is to provide a simple and effective manner of receiving which are received from external IT systems and render the received messages to be compatible with computer languages of spreadsheets.

It is understood, of course, that the Web-based system 1200 is not limited to converting messages from XML, and may instead convert messages to many other types of computer languages, for example, JSON.

In the twelfth exemplary embodiment, a processor, such as the CPU 2804 (FIG. 28) may be specially configured to control the performance of the components in the Web-based system 1200 when performing the above-described functions, and a display of any type (e.g., CRT, LCD, OLED, etc.) may be implemented as part of the Web-based system 1200, or alternatively, may be separate from the Web-based system 1200.

Thirteenth Exemplary Embodiment

Figure 13:
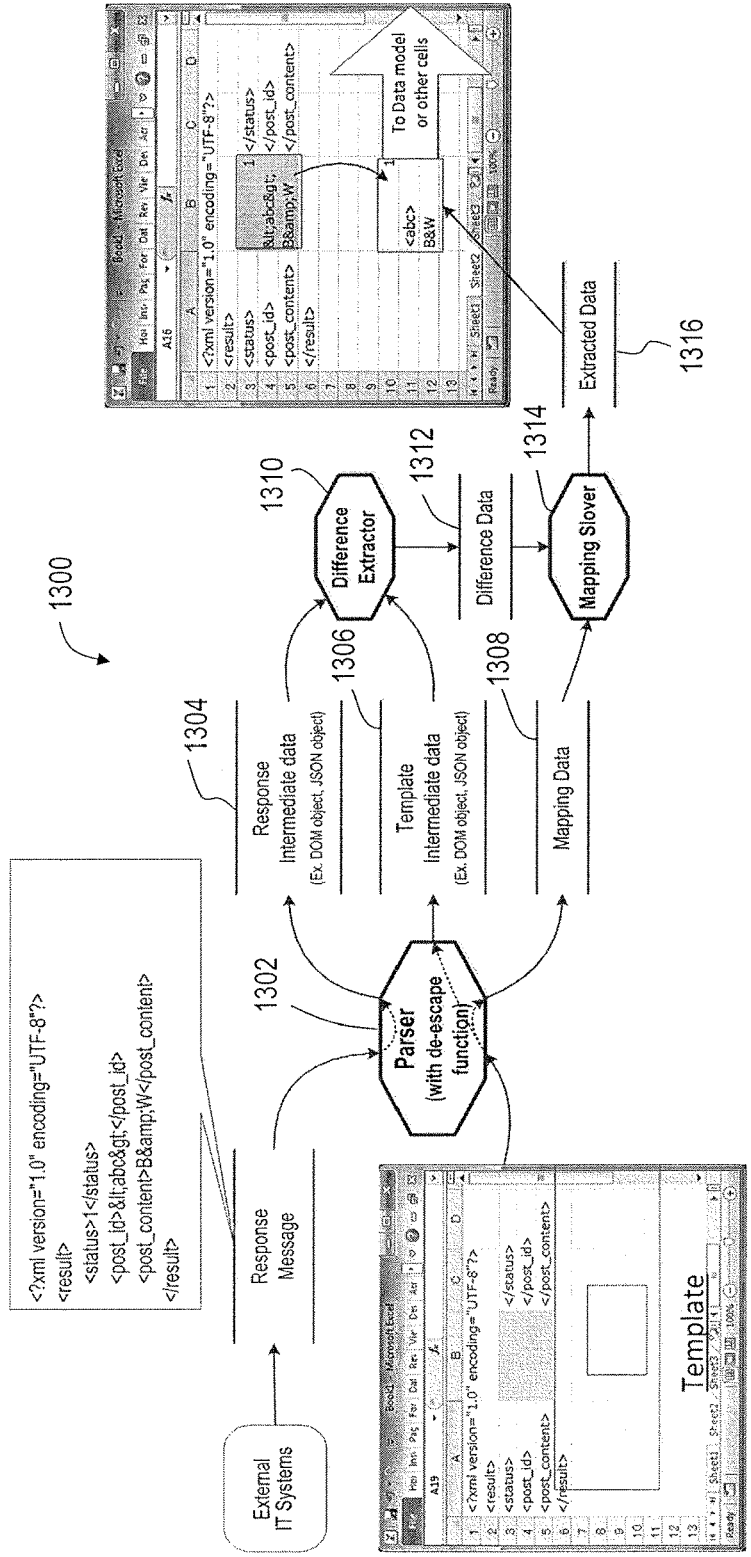
FIG. 13 is an illustration of a Web-based system for processing data according to a thirteenth exemplary embodiment.

FIG. 13 illustrates a Web-based system for processing data according to a thirteenth exemplary embodiment.

The Web-based system 1300 according to the thirteenth exemplary embodiment is different from the Web-based system 1200 according to the twelfth exemplary embodiment in that the Web-based system 1300 according to the thirteenth exemplary embodiment includes a parser 1302, a difference extractor 1310, and a mapping solver 1314.

The parser 1302 is configured to parse a response message received from a system (e.g., an external IT system) to thereby generate response intermediate data 1304. Additionally, the parser 1302 is configured to parse a template and thereby generate template intermediate data 1306 and mapping data 1308. The response intermediate data 1304 and the template intermediate data 1306 may be, for example, an XML object, a document object model (DOM) object, a JSON object, or another type of data. The difference extractor 1310 is configured to determine the difference between the response intermediate data 1304 and the template intermediate data 1306 and generate difference data 1312 representing the difference. The mapping solver 1314 is configured to extract data 1316 from the difference data 1312 by using the mapping data 1308, and then transmit the extracted data 1316 to the appropriate location (e.g., a device or program controlling a data model).

A significant benefit of the thirteenth exemplary embodiment is enhancing certain features of the twelfth exemplary embodiment. XML does not allow a wide range of flexibility. According to the thirteenth exemplary embodiment, a more flexible approach is provided. The response messages received from the external system do not need to exactly match the template, and instead should simply be consistent with a data description language of the template. Instead of using characters to perform a task, the characters are replaced by intermediate data. Furthermore, by using the difference data 1312 and the mapping data 1308, the Web-based system 1300 can identify a source and precisely extract an exact value.

In the thirteenth exemplary embodiment, a processor, such as the CPU 2804 (FIG. 28) may be specially configured to control the performance of the components in the Web-based system 1300 when performing the above-described functions, and a display of any type (e.g., CRT, LCD, OLED, etc.) may be implemented as part of the Web-based system 1300, or alternatively, may be separate from the Web-based system 1300.

Fourteenth Exemplary Embodiment

Figure 14:
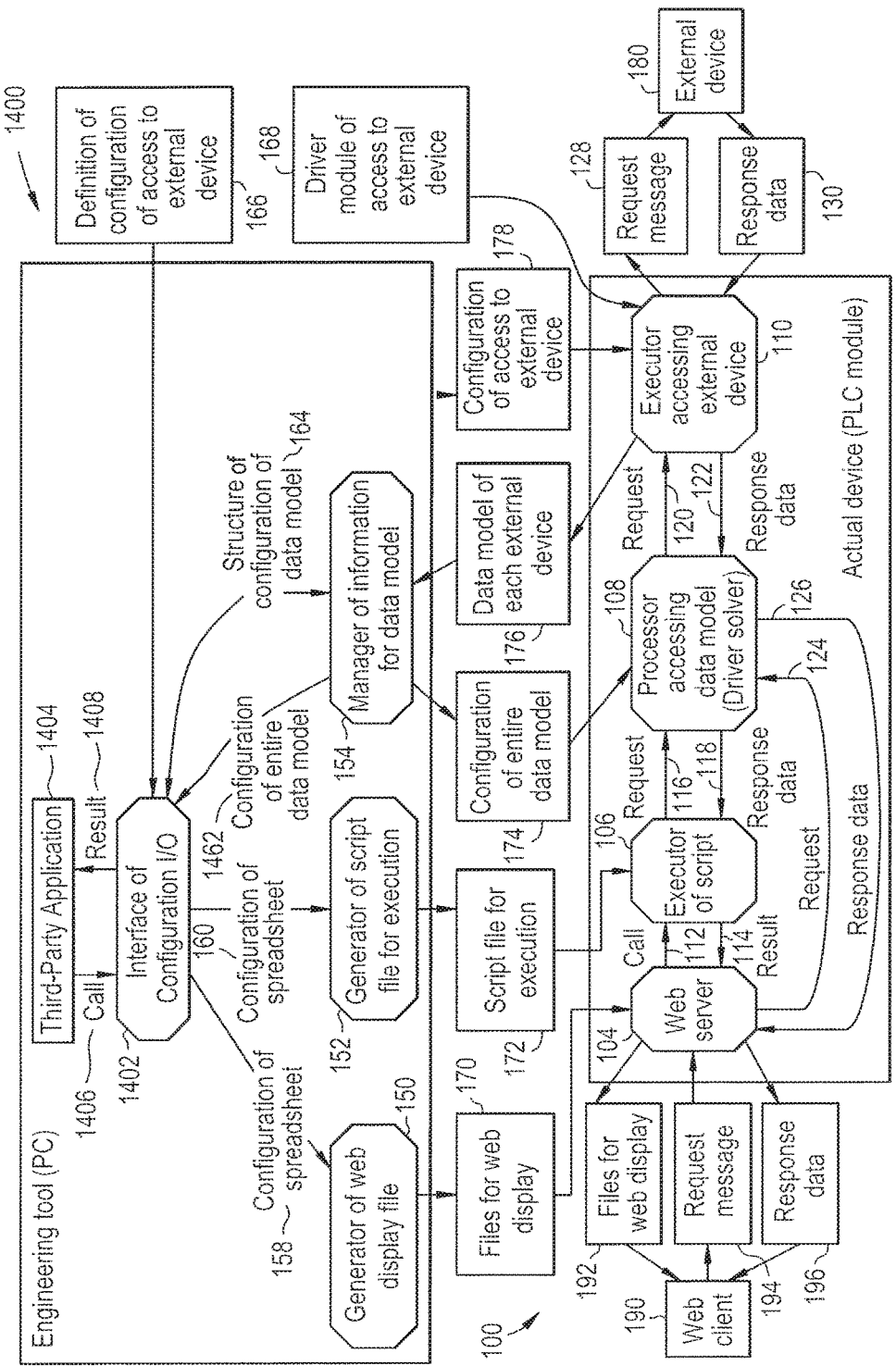
FIG. 14 is an illustration of a Web-based system for processing data according to a fourteenth exemplary embodiment.

FIG. 14 illustrates a Web-based system for processing data according to a fourteenth exemplary embodiment. A difference between the Web-based system 1400 according to the fourteenth exemplary embodiment and the Web-based system 100 according to the first exemplary embodiment is that the Web-based system 1400 according to the fourteenth exemplary embodiment includes an interface of configuration I/O 1402 and a third-party application 1404. The other components shown in FIG. 14 that have the same reference numerals as the components shown in previous figures may be identical to the components shown in the previous figures, and a detailed description thereof is omitted.

The interface of configuration I/O 1402 is an application programming interface (API) which is generated based on the definition of configuration of access to external device 166 and the configuration of entire data model 1462. The interface of configuration I/O 1402 enables 3rd parties to make their branded GUI software easily. The originally generated GUI is hidden, however, useful and versatile GUI parts may be provided to 3rd parties for their convenience. The interface of configuration I/O 1402 is provided as an application programming interface (API) so that a third-party application 1404 can call on internal functions. To call on internal functions, the third party application 1404 transmits a call 1406 to the interface of configuration I/O 1402 and receives a result 1408 from the interface of configuration I/O 1402 based on the call 1406. Examples of internal functions include loading project functionality (e.g., loading a project file made by the original engineering tool in advance as a template), modifying setting functionality (e.g., copying, deleting and modifying the loaded project data from software made by a 3rd party), and writing a project to actual device functionality (e.g., generating scripts and files for a Web screen from the modified project data and transferring the generated scripts and files to actual devices). It is understood that many other types of functions may also be used.

A significant benefit of the fourteenth exemplary embodiment is to enable a third party to make use of a script previously generated by the engineering tool 140. By removing the GUI screen that resulted from spreadsheet editing or flowchart editing, third parties can make use of a script for other purposes. Thus, the fourteenth exemplary embodiment may be useful in a situation in which a 3rd party wishes to add a function or alter a previously existing function, building onto what has already been created by the engineering tool 140. Additionally, by employing the Web-based system according to the fourteenth exemplary embodiment, the third party can create his or her own system, and market and sell the newly created system.

In the fourteenth exemplary embodiment, a processor, such as the CPU 2804 (FIG. 28) may be specially configured to control the performance of the interface of configuration I/O 1402 when performing the above-described functions.

Fifteenth Exemplary Embodiment

Figure 15:
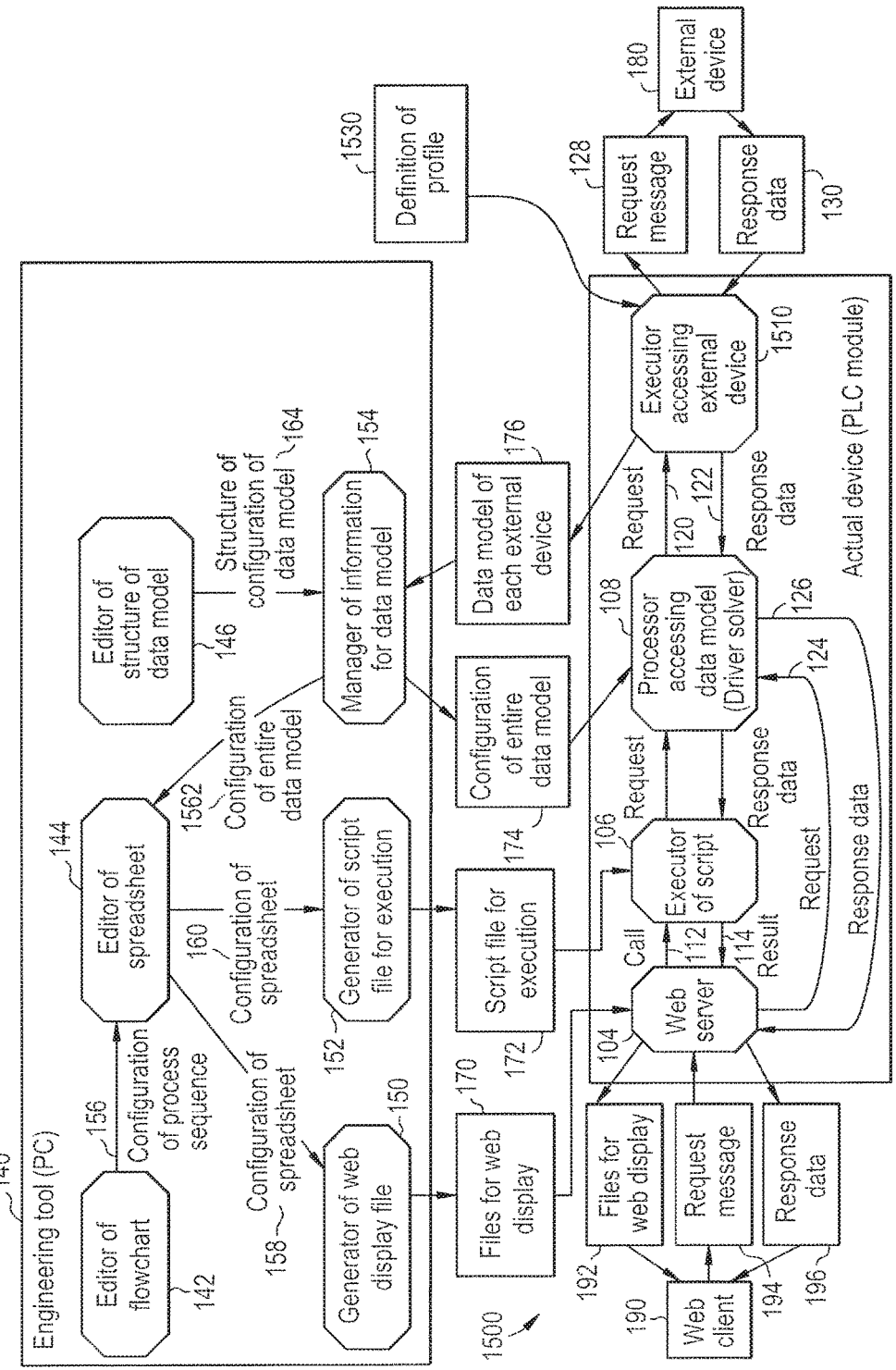
FIG. 15 is an illustration of a Web-based system for processing data according to a fifteenth exemplary embodiment.
Figure 16:
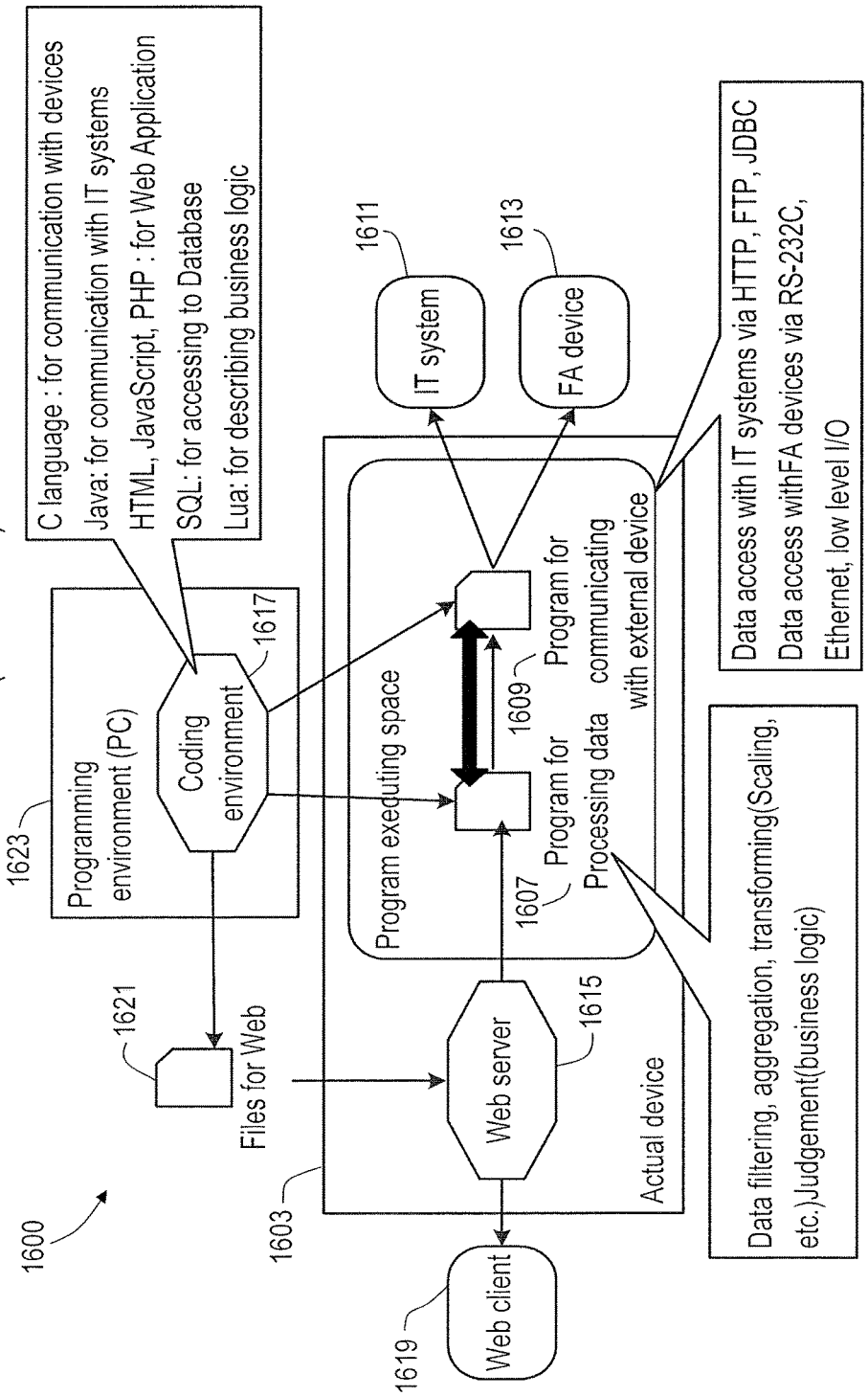
FIG. 16 is an illustration of a Web-based system for processing data according to the related art.

FIG. 15 illustrates a Web-based system for processing data according to a fifteenth exemplary embodiment. A difference between the Web-based system 1500 according to the fifteenth exemplary embodiment and the Web-based system 300 according to the third exemplary embodiment is that the Web-based system 1500 according to the fifteenth exemplary embodiment generates a data model based on a definition of profile 1530. The other components shown in FIG. 15 that have the same reference numerals as the components shown in previous figures may be identical to the components shown in previous figures, and a detailed description thereof is omitted.

The executor accessing with profile 1510 (e.g., "profile executor") is configured to receive the definition of profile 1530 and generate the data model based on the definition of profile 1530.

A significant benefit of the fifteenth exemplary embodiment is that, unlike the third exemplary embodiment in which an access driver is used to generate the data model, in the fifteenth exemplary embodiment, the definition of profile 1530 is used to generate the data model. By using the definition of profile 1530, the user is able to access external devices without device access drives if the external devices support some standardized communication protocols that have a specific profile specification. As a result, only the profile data of the devices is needed, thereby simplifying the data processing operation.

In the fifteenth exemplary embodiment, a processor, such as the CPU 2804 (FIG. 28) may be specially configured to control the performance of the executor accessing with profile 1510 when performing the above-described functions.

Aspects of the exemplary embodiments may be written as computer programs and may be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and other types of recording media.

The foregoing exemplary embodiments and advantages are merely exemplary and are not to be construed as limiting the exemplary embodiments. The exemplary embodiments can be readily applied to other types of devices, such as devices other than factory automation (FA) devices. For example, the exemplary embodiments may be applied to various types of electronic devices connected to each other via a network, e.g., the Internet, the Internet of Things (IOT), a local area network (LAN), a wide area network (WAN), and others. Also, the description of the exemplary embodiments is intended to be illustrative, and not to limit the scope of the claims, and many alternatives, modifications, and variations will be apparent to those skilled in the art.

What is claimed is:

1. An engineering tool, comprising:
a spreadsheet editor configured to display a definition in cells of a spreadsheet, and to edit the definition by setting allocation data of a device to a cell among the cells of the spreadsheet or by setting a calculation defined in some cells among the cells of the spreadsheet in reference to other cells among the cells of the spreadsheet; and
an executable module file generator configured to generate, based on the edited definition, an executable module file configured to be executed in an execution environment of a controller in order for the controller to control the device,
wherein the spreadsheet editor is further configured to convert cell data included in the cells of the spreadsheet from a first format to a second format, concatenate the converted data, and transmit the concatenated data to an external system,
wherein the spreadsheet editor is further configured to receive concatenated data from the external system, de-concatenate the data, convert the de-concatenated data from the second format to the first format, and transmit the converted data to a program or device controlling a data model stored in a system, and
wherein the spreadsheet editor is further configured to parse a response message received from the external system to thereby generate response intermediate data, parse a template received from the external system to thereby generate template intermediate data and mapping data, extract a difference between the response intermediate data and the template intermediate data and thereby generate difference data, map the difference data to final data based on the mapping data, and transmit the final data to the program or device controlling the data model.

2. The engineering tool of claim 1, wherein the engineering tool further comprises a spreadsheet data generator configured to generate spreadsheet data in a data description language, and transmit the spreadsheet data to the controller.

3. The engineering tool of claim 1, wherein the engineering tool further comprises a flowchart editor configured to receive input editing a process sequence in a flowchart and edit the definition based on the input.

4. The engineering tool of claim 1, further comprising a Web display file generator configured to generate Web files based on the edited definition.

5. The engineering tool of claim 1, wherein the engineering tool is configured to cause a display to display the spreadsheet and a data model comprising information about the device simultaneously.

6. The engineering tool of claim 1, wherein the engineering tool is configured to cause a display to display the spreadsheet and a flowchart related to the spreadsheet simultaneously.

7. The engineering tool of claim 1, wherein the engineering tool further comprises:
a third-party application; and
an input/output (I/O) configuration interface configured to grant the third-party application access to at least one function of the engineering tool.

8. The engineering tool of claim 1, further comprising a profile executor configured to generate a data model related to the spreadsheet based on a profile definition and link the data model to the spreadsheet.

9. A system configured to process data, the system comprising:
an engineering tool, comprising:
a spreadsheet editor configured to display a spreadsheet comprising data of a device and to execute a spreadsheet program based on the data and thereby generate a spreadsheet configuration as an execution result;
a module file generator configured to generate a module file based on the spreadsheet configuration;
an external device access configuration editor configured to generate a configuration screen based on a data description language; and
a data model information manager configured to generate a configuration of an entire data model based on data models of a plurality of external devices, and
a controller comprising:
a module file executor configured to execute the module file separately from the spreadsheet editor executing the spreadsheet program;
an external device executor configured to obtain device information of the plurality of external devices and generate the data models based on the device information; and
a driver solver configured to generate an interface to enable access to device data of the external devices based on the entire data model.

10. The system of claim 9, wherein the engineering tool further comprises a data model structure editor configured to receive user input and edit a structure of one of the data models based on the user input.

11. The system of claim 10, wherein the spreadsheet editor is configured to generate the spreadsheet configuration based on the entire data model.

12. The system of claim 11, wherein the engineering tool further comprises a Web display file generator configured to generate Web files based on the spreadsheet configuration, and wherein the controller further comprises a Web server configured to exchange the Web files with a Web client.

13. An engineering tool for generating a module file which a controller executes to control a device connected to the controller, the engineering tool comprising:
a spreadsheet editor configured to display a spreadsheet comprising data of a device and to execute a spreadsheet program based on the data and thereby generate a spreadsheet configuration as an execution result; and
a module file generator configured to generate the module file based on the spreadsheet configuration,
wherein the spreadsheet editor is further configured to convert cell data included in cells of the spreadsheet from a first format to a second format, concatenate the converted data, and transmit the concatenated data to an external system,
wherein the spreadsheet editor is further configured to receive concatenated data from the external system, de-concatenate the data, convert the de-concatenated data from the second format to the first format, and transmit the converted data to a program or device controlling a data model stored in a system, and
wherein the spreadsheet editor is further configured to parse a response message received from the external system to thereby generate response intermediate data, parse a template received from the external system to thereby generate template intermediate data and mapping data, extract a difference between the response intermediate data and the template intermediate data and thereby generate difference data, map the difference data to final data based on the mapping data, and transmit the final data to the program or device controlling the data model.

14. A module to be used in a controller to control a device connected to the controller based on a module file generated by an engineering tool based on a spreadsheet, the module comprising:
a module file executor configured to execute the module file separately from the engineering tool,
wherein the controller controls the device according to the execution of the module file executor.

15. The engineering tool of claim 1, further comprising:
a data model information manager configured to generate a configuration of an entire data model based on a data model of the device.

16. The engineering tool of claim 15, further comprising:
a data model structure editor configured to receive user input and edit a structure of the data model based on the user input.

17. The engineering tool of claim 16, wherein the spreadsheet editor is configured to edit the definition based on the entire data model.

18. The engineering tool of claim 16, wherein
the data model structure editor is configured to transmit a data model configuration structure to the data model information manager, and
the data model information manager is configured to generate the entire data model based on the data model and the data model configuration structure.

* * * * *